(12) United States Patent
Kuramori et al.

(10) Patent No.: US 7,649,445 B2
(45) Date of Patent: Jan. 19, 2010

(54) APPARATUS AND METHOD FOR EVALUATING DRIVING SKILL AND APPARATUS AND METHOD FOR INFORMING EFFICIENCY OF DRIVER'S PHYSICAL LOAD TO DRIVING OPERATION

(75) Inventors: Akira Kuramori, Kanagawa (JP); Noritaka Koguchi, Kanagawa (JP); Masayoshi Kamijo, Nagano (JP); Tsugutake Sadoyama, Ibaraki (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 527 days.

(21) Appl. No.: 11/454,189

(22) Filed: Jun. 15, 2006

(65) Prior Publication Data

US 2007/0290867 A1  Dec. 20, 2007

(51) Int. Cl.
  *B60Q 1/00* (2006.01)
(52) U.S. Cl. .................. 340/439; 340/438; 340/575; 340/576; 701/48; 701/70; 701/42; 701/72; 701/300; 600/546; 600/590; 434/62
(58) Field of Classification Search .................. 340/439, 340/575, 438, 576; 600/546, 590; 701/48, 701/70, 42, 72, 300; 434/62
  See application file for complete search history.

(56) References Cited

U.S. PATENT DOCUMENTS 5,913,910 A    6/1999  Ochi et al.

(Continued)

FOREIGN PATENT DOCUMENTS

DE    103 22 458 A1    12/2004

(Continued)

OTHER PUBLICATIONS

European Search Report by European Patent Office on Jan. 24, 2007.

*Primary Examiner*—Benjamin C Lee
*Assistant Examiner*—Ojiako Nwugo
(74) *Attorney, Agent, or Firm*—Knobbe Martens Olson & Bear, LLP

(57) ABSTRACT

The driving skill evaluating apparatus is an apparatus that evaluates the driving skill of a driver who drives a vehicle. The evaluating apparatus includes: driver load measurement means for measuring the degree of physical load on the driver in a driving operation activity of the vehicle; driving operation quantity measurement means for measuring the quantity of driving operation performed by the driver for the vehicle in the driving operation activity; and evaluation means for evaluating the driving skill of the driver by using the degree of the physical load on the driver and the quantity of driving operation. And the driving load efficiency informing apparatus includes: the driver load measurement means: the driving operation quantity measurement means; load efficiency judgment value calculating means for calculating a load efficiency judgment value indicating a efficiency of efficiency of the physical load on the driver in the driving operation activity of the vehicle to the quantity of driving operation performed by the driver for the vehicle in the driving operation activity of the vehicle, by using the degree of the physical load on the driver and the quantity of driving operation; and informing means for informing the driver of the efficiency of the physical load on the driver to the driving operation activity of the vehicle in accordance with the load efficiency judgment value.

19 Claims, 12 Drawing Sheets

U.S. PATENT DOCUMENTS

| | | |
|---|---|---|
| 5,991,675 A | 11/1999 | Asanuma |
| 6,631,211 B1* | 10/2003 | Schermer et al. ............. 382/225 |
| 7,089,101 B2* | 8/2006 | Fischer et al. ................. 701/41 |
| 2003/0097047 A1* | 5/2003 | Woltermann et al. ........ 600/300 |
| 2004/0102898 A1* | 5/2004 | Yokota et al. ................ 701/210 |
| 2005/0012625 A1* | 1/2005 | Hayashi et al. ............. 340/575 |
| 2005/0030184 A1 | 2/2005 | Victor |
| 2005/0090757 A1* | 4/2005 | Kuramori et al. ........... 600/546 |
| 2005/0234626 A1 | 10/2005 | Shiiba et al. |

FOREIGN PATENT DOCUMENTS

| | | |
|---|---|---|
| DE | 103 43 683 A1 | 4/2005 |
| EP | 1 516 586 A2 | 3/2005 |
| JP | 2002-230699 | 8/2002 |
| JP | 2003-81040 A | 3/2003 |
| JP | 2003-177079 | 6/2003 |

\* cited by examiner

STEERING ANGLE (HND)

TIME (sec)

MYOELECTRIC POTENTIAL OF LEFT DELTOID MUSCLE

TIME (sec)

MYOELECTRIC POTENTIAL OF RIGHT DELTOID MUSCLE

TIME (sec)

STEERING ANGLE (DEGREE)

TIME(sec)

MYOELECTRIC POTENTIAL OF RIGHT DELTOID MUSCLE

TIME(sec)

MYOELECTRIC POTENTIAL OF LEFT DELTOID MUSCLE

TIME(sec)

APPARATUS AND METHOD FOR EVALUATING DRIVING SKILL AND APPARATUS AND METHOD FOR INFORMING EFFICIENCY OF DRIVER'S PHYSICAL LOAD TO DRIVING OPERATION

BACKGROUND OF THE INVENTION

The present invention relates to an apparatus and a method for evaluating driving skill of a driver who drives an automobile vehicle or a two-wheeled motor vehicle and an apparatus and a method for informing a driver who drives a vehicle of efficiency of a driver's physical load to a driving operation of the vehicle.

In the evaluation of a characteristic of a driver who drives an automobile vehicle, the evaluation of drivability of an automobile vehicle, the operational support control for supporting an operation activity of a driver who drives an automobile vehicle to control the behavior of the automobile vehicle and the like, information of the automobile vehicle that is being driven or biological information of the driver who is driving are currently used.

For example, JP 2003-81040 A (publication1) discloses a driving technique diagnostic device including determination means for determining a driving technique level of a driver (for example, the level of proficiency of the driving technique or the degree of risk in driving) based on driving information regarding an automobile vehicle (for example, the number of engine revolutions obtained by a depressed accelerator pedal or clutch pedal, the number of revolutions of a transmission input shaft or the like). The driving technique diagnostic device disclosed in publication1 classifies the driving technique of the driver into one of the levels or judges whether or not the driving technique of the driver is at a given level based on the driving information. The driving technique diagnostic device disclosed in publication1 can inform the other drivers driving in the surrounding area, for example, of low proficiency of the driving technique of the driver, the high risk in driving, or the like based on the result of judgment. In publication1, the use of the driving technique diagnostic device as described above allows the realization of safe and smooth drive.

Moreover, for example, JP 2002-230699 A (publication2) discloses an operation load judgment device which uses information of myoelectric potentials of a plurality of muscles involved in a vehicle driving operation activity performed by a driver to judge the degree of operation load placed on the driver. In the operation load judgment device disclosed in publication2, for the myoelectric potentials of a plurality of muscles involved in a vehicle driving operation activity, a competitive value for the competition between the myoelectric potentials is calculated. Based on the calculated competitive value, the degree of operation load on the driver is judged. The operation load judgment device disclosed in publication2 can judge the degree of load placed on the driver, which is caused by the difficulty of the driving operation activity in that, for example, the driver is not able to control an automobile as he/she wants (i.e., as expected for the driving operation) based on measured values of the myoelectric potentials of both arms of the driver. Then, the obtained result of judgment is applied to a lane change system, an obstacle warning system, or the like to enable the correction of the contents of control. In the operation load judgment system disclosed in publication2, for example, it is considered that, the more the load placed on the driver increases, the less the driver feels a sense of relaxation. Thus, based on the result of judgment, an alarm output or control intervention is corrected.

As described above, the driving technique diagnostic device disclosed in publication1 judges the technical level of a driver (for example, the proficiency of a driving technique or the risk in driving) based uniquely on the driving information related to the automobile vehicle (for example, the number of engine revolutions obtained by the depressed accelerator pedal or clutch pedal, the number of revolutions of the transmission input shaft, or the like). Such a driving technique diagnostic device disclosed in publication1 is not able to quantitatively evaluate the technique level of the driver with high accuracy. For example, it is assumed that one of a plurality of different drivers performs a driving operation under higher tension at a higher level of concentration, and therefore, under a greater physical load as well as a greater mental load. It is also assumed that the other drivers perform a driving operation in a more relaxed state under a less physical load as well as a less mental load. The driving technique diagnostic device disclosed in publication1 judges the technique levels of these different drivers as approximately the same if the driving information of each of the drivers during driving is the same (when the drivers drive the same types of automobile vehicle in the same manner, specifically, the number of engine revolutions obtained by the depressed accelerator pedal or clutch pedal, the number of revolutions of the transmission input shaft, or the like is the same for each of the drivers). Even when the same driving operation is performed, the driving operation is performed in a more relaxed state under a less physical load as well as a less mental load as the driver has a higher technical level. In the above-mentioned example, the driver who performs a driving operation in a more relaxed state under a less physical load as well as a less mental load should be judged as having a higher technical level. As described above, the driving technique diagnostic device disclosed in publication1 is disadvantageous in that the driving technique level cannot be quantitatively determined with high accuracy in consideration of the state of the driver as described above.

Moreover, the operation load judgment device disclosed in publication2 measures the myoelectric potentials of both arms to calculate the competitive value between the myoelectric potentials of both arms. Then, based on the calculated competitive value, the degree of load placed on the driver, which is caused by the difficulty in the driving operation activity in that the driver is not able to control an automobile as he/she wants (i.e., as expected for the driving operation). However, the vehicle driving operation activity is for steering the vehicle by the movement of muscles of the driver. Thus, if active steering (e.g., complicated steering in a short period of time) is required, it is natural that the competitive value between the myoelectric potentials becomes large. The operation load judgment device disclosed in publication2 inevitably judges that the degree of load placed on the driver (e.g., the load caused by the difficulty in that the driver is not able to control the automobile as he/she wants) is relatively high when the driver steers the vehicle in an active manner even though the driver actually controls the automobile as he/she wants. If such a result of judgment is applied to the lane change system, the obstacle warning system, or the like, it is judged that the driver's relaxation level is low even though an actual operation load is not that large. As a result, there arises a problem that the alarm output or the control intervention is needlessly performed.

SUMMARY OF THE INVENTION

In order to solve the above problems, the present invention has an object of providing an evaluating apparatus and an evaluating method for quantitatively evaluating driving skill of a driver who drives an automobile vehicle or a two-wheeled motor vehicle, with high accuracy, and an informing apparatus and an informing method for informing the driver who drives the vehicle of efficiency of a driver's physical load in a driving operation activity of the vehicle, with high accuracy.

In order to achieve the above-mentioned object, the present invention provides an evaluating apparatus for evaluating driving skill of a driver who drives a vehicle, the evaluating apparatus including: driver load measurement means for measuring the degree of physical load on the driver in a driving operation activity of the vehicle; driving operation quantity measurement means for measuring the quantity of driving operation performed by the driver for the vehicle in the driving operation activity; and evaluation means for evaluating the driving skill of the driver by using the degree of the physical load on the driver and the quantity of driving operation.

Preferably, the evaluation means calculates an evaluation value indicating efficiency of the physical load on the driver in the driving operation activity of the vehicle to a workload performed by the driver for the vehicle in the driving operation activity of the vehicle from the degree of physical load on the driver and the quantity of driving operation to judge a level of the driving skill of the driver by using the evaluation value.

Preferably, the evaluation means compares the evaluation values and a predetermined reference value with each other to judge the level of the driving skill of the driver based on the result of comparison.

Preferably, at this time, the predetermined reference value is set in accordance with at least one of the vehicle driven by the driver and a road on which the vehicle runs by the driving of the driver.

Preferably, the evaluation means creates a scatter diagram showing a relation between the degree of physical load and the quantity of driving operation and judges the level of the driving skill of the driver in accordance with a relative positional relation between the position of a point indicating the relation in the scatter diagram and a predetermined judgment area in the scatter diagram.

Preferably, the predetermined judgment area is set in accordance with at least one of the vehicle driven by the driver and a road on which the vehicle runs by the driving of the driver.

Preferably, the driver load measurement means includes: a myoelectric potential detecting section for detecting a myoelectric potential of a specific muscle of the driver, the specific muscle being involved in the driving operation activity; and a calculating section for calculating the degree of physical load on the driver from information of the myoelectric potential.

Preferably, the driving operation quantity measurement means includes: a steering angle detecting section for detecting a steering angle of the vehicle, the steering angle being generated with the driving operating activity of the driver; and a calculating section for calculating the quantity of driving operation from information of the steering angle of the vehicle.

Preferably, the driving operation quantity measurement means further includes a steering torque detecting section for detecting a steering torque about a steering shaft of the vehicle, the steering torque being generated with the driving operation activity of the driver, in which the calculating section calculates the workload performed by the driver for the vehicle in the driving operation activity of the driver as the quantity of driving operation from the information of the steering angle detected by the steering angle detecting section and information of the steering torque detected by the steering torque detecting section.

Preferably, the evaluating apparatus further includes mental load quantity measurement means for measuring a mental load quantity generated with the driving operation activity of the driver who drives the vehicle, and the evaluation means uses the mental load quantity in addition to the degree of physical load on the driver and the quantity of driving operation to evaluate the driving skill of the driver.

Preferably, the mental load quantity measurement means detects an activity of a muscle which is independent of the driving operation of the driver and detects the mental load quantity based on the activity of the muscle.

Preferably, the evaluating apparatus further including trajectory deviation measurement means for detecting the amount of deviation of a trajectory of the vehicle by the driving operation activity of the driver from a lane along which the vehicle is targeted to run, and the evaluation means evaluates the driving skill of the driver by using the amount of deviation of the trajectory of the vehicle in addition to the degree of physical load on the driver and the quantity of driving operation.

Preferably, the evaluation means corrects the result of evaluation based on at least one piece of information indicating a state of the vehicle, information indicating a condition of the road, and information indicating a state of an ambient environment of the vehicle.

Preferably, the evaluation means outputs the result of evaluation of the driving skill of the driver in association with a road surface condition of the road.

The present invention also provides an apparatus for informing a driver who drives a vehicle of efficiency of a physical load of the driver to a driving operation activity of the vehicle, the apparatus including: driver load measurement means for measuring the degree of physical load on the driver in the driving operation activity of the vehicle; driving operation quantity measurement means for measuring the quantity of driving operation performed by the driver for the vehicle in the driving operation activity; load efficiency judgment value calculating means for calculating a load efficiency judgment value indicating a efficiency of the physical load on the driver in the driving operation activity of the vehicle to the quantity of driving operation performed by the driver for the vehicle in the driving operation activity of the vehicle, by using the degree of the physical load on the driver and the quantity of driving operation; and informing means for informing the driver of the efficiency of the physical load on the driver to the driving operation activity of the vehicle in accordance with the load efficiency judgment value.

Preferably, the informing apparatus further includes judgment means for comparing the load efficiency judgment value calculated by the load efficiency judgment value calculating means and a predetermined judgment reference value to judge a level of the efficiency of the physical load on the driver to the driving operation activity of the vehicle based on the result of comparison, in which the informing means informs the driver of the efficiency of the physical load on the driver in an informing mode in accordance with the result of judgment.

Preferably, the informing means issues a warning to the driver when the load efficiency judgment value is smaller than a predetermined warning reference value in the judgment means.

The present invention also provides a method of evaluating driving skill of a driver who drives a vehicle, including: a driver load measuring step of measuring the degree of physical load on the driver in a driving operation activity of the vehicle; a driving operation quantity measuring step of measuring the quantity of driving operation performed by the driver for the vehicle in the driving operation activity of the vehicle; and an evaluating step of evaluating the driving skill of the driver by using the degree of physical load on the driver and the quantity of driving operation.

Preferably, the evaluating step calculates an evaluation value indicating efficiency of the degree of physical load on the driver in the driving operation activity of the vehicle to the quantity of driving operation performed by the driver for the vehicle in the driving operation activity of the vehicle from the degree of physical load on the driver and the quantity of driving operation to judge a level of the driving skill of the driver by using the evaluation value.

The present invention also provides a method of informing a driver who drives a vehicle of efficiency of a physical load of the driver to a driving operation activity of the vehicle, the method including: a driver load measuring step of measuring the degree of physical load on the driver in the driving operation activity of the vehicle; a driving operation quantity measuring step of measuring the quantity of driving operation performed by the driver for the vehicle in the driving operation activity; a load efficiency judgment value calculating step of calculating a load efficiency judgment value indicating efficiency of the degree of physical load on the driver in the driving operation activity of the vehicle to the quantity of driving operation performed by the driver for the vehicle in the driving operation activity of the vehicle by using the degree of physical load on the driver and the quantity of driving operation; and an informing step of informing the driver of the efficiency of the physical load on the driver to the driving operation activity of the vehicle in accordance with the load efficiency judgment value.

According to the present invention, for example, the driving skill of the driver who drives the vehicle can be precisely evaluated based on the degree of physical load on the driver during the driving and the workload performed by the driver for the vehicle. For example, the level of the driving skill of the driver in accordance with a condition of a road on which the driver drives can be qualitatively and quantitatively evaluated. Moreover, the operability of the vehicle driven by the driver can also be qualitatively and quantitatively evaluated. Moreover, the driver who drives the vehicle can be precisely informed of the efficiency of the physical load on the driver in the driving operation activity of the vehicle.

DETAILED DESCRIPTION OF THE PREFERRED EMBODIMENT

Hereinafter, an apparatus and a method for evaluating driver's driving skill, and an apparatus and a method for informing efficiency of a driver's physical load to a driving operation according to the present invention will be described in detail based on preferred embodiments illustrated in the accompanying drawings.

Figure 1:
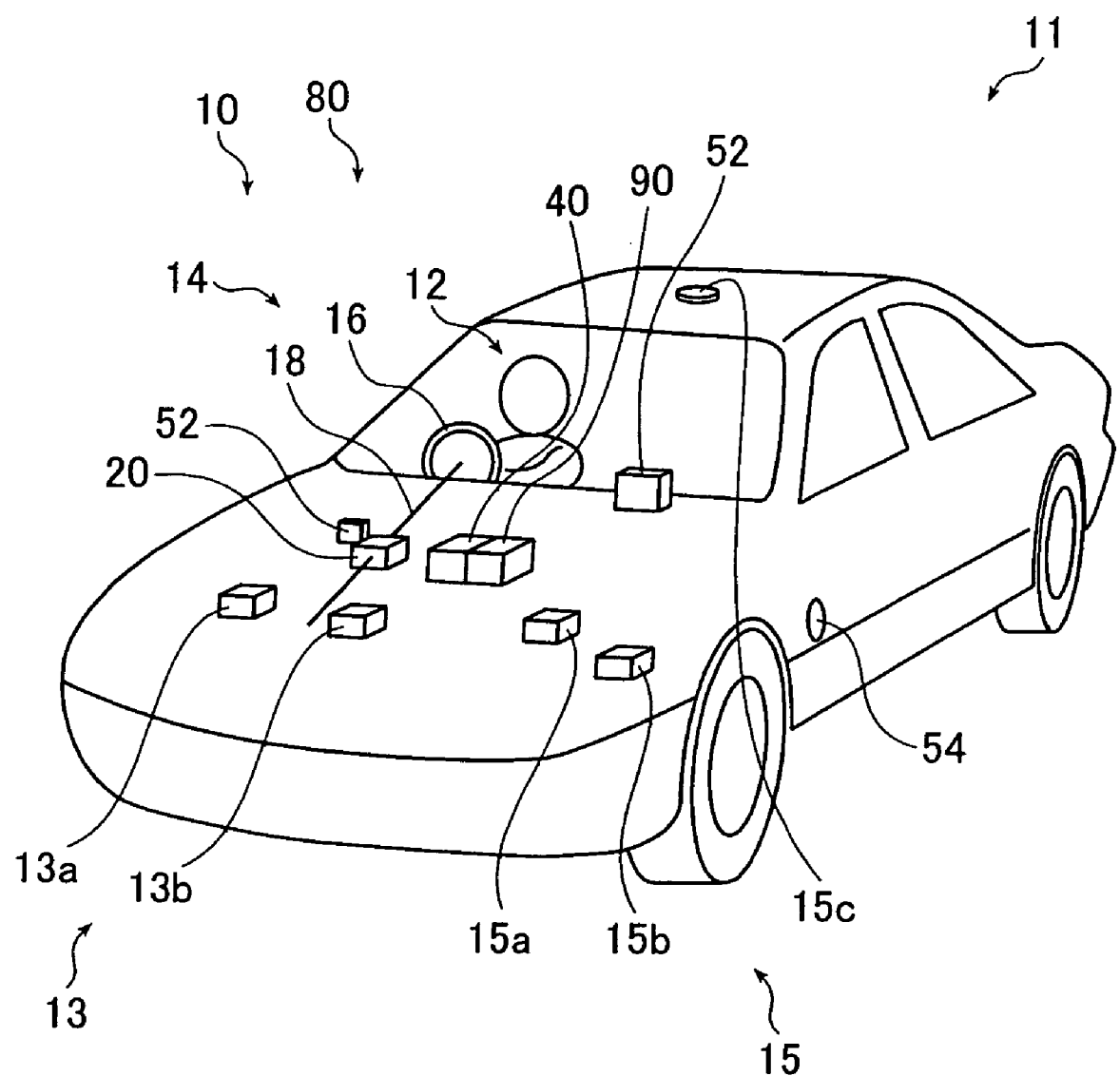
FIG. 1 is a schematic configuration view for explaining a vehicle equipped with an apparatus for evaluating driving skill of a driver and an apparatus for informing efficiency of a physical load of the driver to a driving operation according to the present invention.

FIG. 1 is a schematic configuration view for explaining a vehicle 11 equipped with an apparatus for evaluating driver's driving skill and an apparatus for informing a efficiency of a driver's physical load to a driving operation according to the present invention. The vehicle 11 is equipped with an evaluation apparatus 10 for evaluating driving skill of a driver 12 and an informing apparatus 80 for informing efficiency of a physical load on the driver 12 to a driving operation activity of the vehicle 11 performed by the driver 12. The evaluation apparatus 10 and the informing apparatus 80 measure the degree of physical load (the quantity of physical load) on the driver 12 who drives the vehicle 11 in the driving operation activity. Further, the evaluation apparatus 10 and the informing apparatus 80 measure the degree of driving operation (the quantity of driving operation) that the driver 12 performs for an operation system 14 of the vehicle in the driving operation activity. Then, the evaluation apparatus 10 uses the obtained quantity of physical load and the obtained quantity of driving operation to evaluate the driving skill of the driver 12. The informing apparatus 80 uses the degree of physical load (the quantity of physical load) on the driver 12 in the driving operation activity and the degree of driving operation (the quantity of driving operation) performed by the driver 12 to calculate an evaluation value indicating the efficiency of the physical load on the driver 12 to the driving operation activity performed by the driver 12. In this embodiment, as the efficiency of the physical load, a ratio of the workload (corresponding to the quantity of driving operation described below) performed by the driver 12 for the vehicle 11 in the driving operation activity of the vehicle 11 to the degree of physical load on the driver 12 is used. In the vehicle 11, the evaluation apparatus 10 and the informing apparatus 80 share a part of means (more specifically, physical load measurement means 30 described below (not shown in FIG. 1), operation quantity measurement means 20, a monitor 52, and the like).

The vehicle 11 is provided with motion information acquisition sensors 13 for obtaining information regarding the motion of the driving operation of the driver 12 in the driving operation activity of the driver 12. The motion information acquisition sensors 13 include a brake pressure sensor 13a for obtaining information regarding a brake pedal pressing motion of the driver 12, and a throttle sensor 13b for obtaining information regarding an accelerator pedal pressing motion of the driver 12. The vehicle 11 is also provided with a vehicle behavior information acquisition sensor 15 for obtaining information of behavior of the vehicle 11 in accordance with the driving operation activity performed by the driver 12. For the vehicle behavior information acquisition sensor 15, a yaw rate sensor 15a for detecting behavior of the vehicle 11 in a yaw direction, a vehicle speed sensor 15b for detecting the speed of the vehicle 11, a GPS sensor 15c for detecting the position of the vehicle 11, or the like are provided. The motion information obtained by the motion information acquisition sensor 13 and the vehicle behavior information obtained by the vehicle behavior information acquisition sensor 15 are used for the evaluation of the driving skill by the evaluation apparatus 10 and for the calculation of the evaluation value indicating the efficiency of the physical load by the informing apparatus 80, described below.

First, the apparatus and the method for evaluating the driving skill of the driver according to the present invention will be described.

Figure 2:
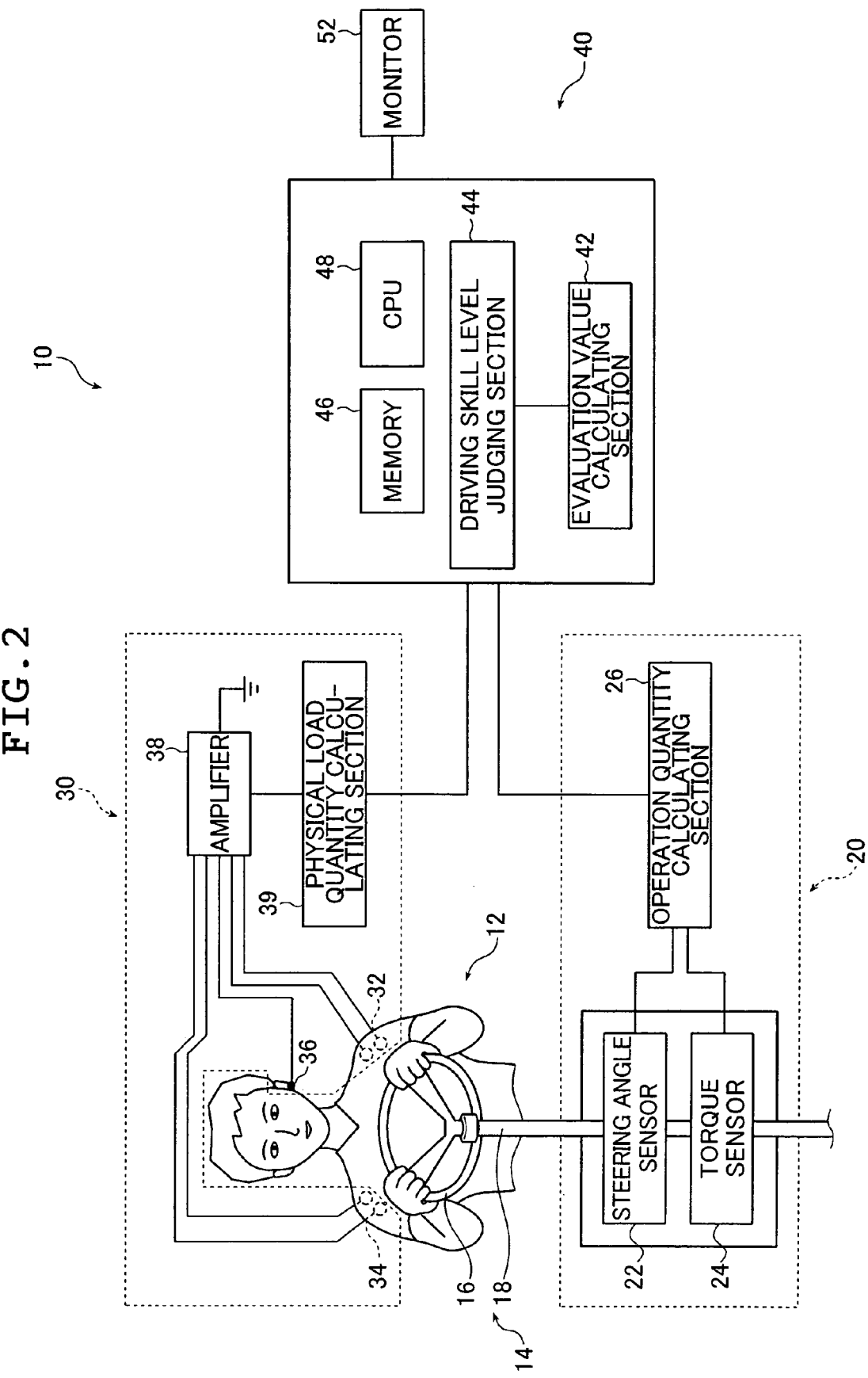
FIG. 2 is a schematic configuration view for explaining an example of the apparatus for evaluating the driving skill of the driver according to the present invention.

FIG. 2 is a schematic configuration view for explaining the evaluation apparatus 10 provided for the vehicle 11, which corresponds to an example of the apparatus for evaluating the driving skill of the driver according to the present invention.

The evaluation apparatus 10 measures the degree of physical load on the driver 12 who drives the vehicle in the driving operation activity and the quantity of driving operation performed by the driver 12 on the vehicle 11 (more specifically, the operation system 14 of the vehicle 11). The evaluation apparatus 10 uses the degree of physical load and the quantity of driving operation to evaluate the driving skill of the driver 12. The evaluation apparatus 10 includes operation quantity measurement means 20, physical load measurement means (load measurement means) 30, and data processing means 40.

The operation quantity measurement means 20 includes a steering angle sensor 22, a torque sensor 24, and an operation quantity calculating section 26. The steering angle sensor 22 detects an angle of rotation of a steering wheel 16 borne by a steering shaft 18. Specifically, the steering angle sensor 22 detects and outputs the angle of rotation (steering angle) of the steering wheel 16 about the steering shaft 18 in the driving operation activity of the driver 12. The torque sensor 24 detects and outputs a torque about the steering shaft 18, which is generated by the driving operation activity of the driver 12 (rotational operation of the steering wheel 16). The operation quantity calculating section 26 obtains information of each of the output steering angle and the output torque in time series. Then, the operation quantity calculating section 26 processes a time-series waveform indicating a time variation of each piece of the information to obtain information indicating the quantity of driving operation (operation quantity information) performed by the driver 12 on the vehicle 11.

The steering angle sensor 22 may be any known rotation angle detection means, and the torque sensor 24 may be any known torque sensor. The time-series data of the steering angle detected by the steering angle sensor 22 and the time-series data of the torque detected by the torque sensor 24 are transmitted to the operation quantity calculating section 26. The operation quantity calculating section 26 samples the time-series data of the steering angle and the time-series data of the torque to generate a waveform representing a time variation of the steering angle (steering angle waveform) and a waveform representing a time variation of the torque (torque waveform). The operation quantity calculating section 26 uses the thus obtained steering angle waveform and torque waveform to calculate operation quantity information.

Figure 3A:
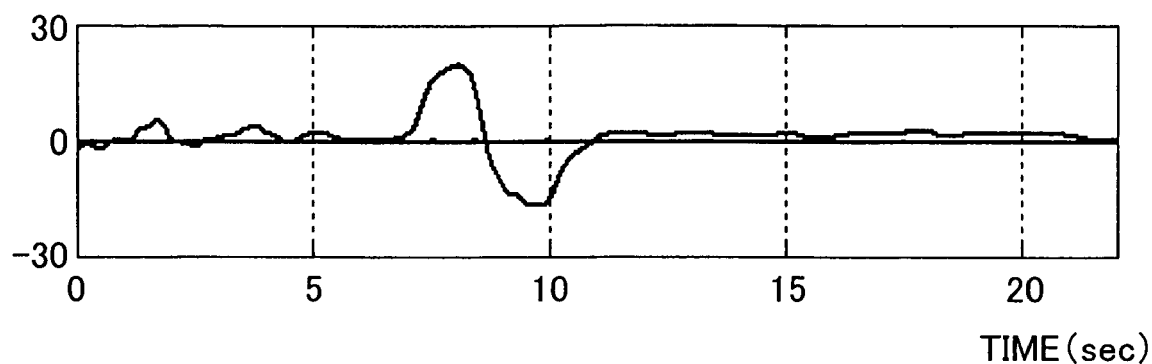
FIG. 3A is a graph showing an example of a steering angle waveform generated by an operation quantity information calculating section of the apparatus shown in FIG. 2, and FIGS. 3B and 3C are graphs showing myoelectric potential waveforms of the left and right deltoid muscles, which correspond to the steering angle waveform shown in FIG. 3A.

FIG. 3A shows an example of the steering angle waveform generated in the operation quantity calculating section 26. More specifically, the operation quantity calculating section 26 samples each piece of the time-series data of the steering angle and the time-series data of the torque, and performs full-wave rectification on each piece of the time-series data. Thereafter, the time-series data is smoothed by using a smoothing filter (low-pass filter) to generate a steering angle waveform and a torque waveform. Next, the operation quantity calculating section 26 performs time-differentiation on the steering angle waveform to generate a waveform (steering angular velocity waveform) representing a time variation of the quantity of fluctuation in steering angle per unit time (that is, a steering angular velocity). Then, the operation quantity calculating section 26 multiplies a value of the steering angular velocity waveform by that of the torque waveform, obtained at the same time (per unit time). The operation quantity calculating section 26 multiplies the value of the steering angular velocity waveform by the value of the torque waveform to obtain a waveform representing a time variation (work rate waveform) in a work performed by the driver 12 on the vehicle 12 per unit time (that is, a work rate). Then, the operation quantity calculating section 26 obtains a mean value for each predetermined period of time (simple arithmetic mean value) for such a work rate waveform to generate a waveform representing a deviation of the work rate waveform from the obtained average value (operation quantity evaluation waveform) for each predetermined period of time. Then, a root means square (RMS) value of the operation quantity evaluation waveform for each predetermined period of time is obtained. The RMS value corresponds to a root means square (squareroot of sum of squares) of the operation quantity evaluation waveform. The RMS value of the operation quantity evaluation waveform represents the workload performed by the driver 12 on the vehicle 12 when the driver performs the driving operation activity over the predetermined period of time described above. The operation quantity calculating section 26 calculates the RMS value for each predetermined period of time as described above as information indicating the quantity of driving operation for each predetermined period of time (operation quantity information).

The predetermined period of time is, for example, 0.5 to 10 seconds, preferably, about 3.0 seconds. The predetermined period of time is a value selected in consideration of a frequency of corrective steering (steering for keeping constant a travel direction of a vehicle which is running straight ahead) frequently performed by a general driver during the driving of a vehicle. The operation quantity information (RMS values of the work rate waveform) is transmitted to the data processing means 40. The RMS value of the work rate waveform for each predetermined period of time may be used for the operation quantity information. The operation quantity information is not limited to the above-described RMS value, but may simply be an integrated value of the operation quantity evaluation waveform or of the work rate waveform over a predetermined period of time.

In the method of evaluating driving skill according to the present invention, the operation quantity information may be set to any value as long as the value indicates the quantity of driving operation performed by the driver on the vehicle, and therefore, is not limited to a value in accordance with the operation quantity evaluation waveform or the work rate waveform described above (for example, the RMS value). For example, an RMS value of the steering angle waveform may be used. In the case where the work rate waveform or the operation quantity evaluation waveform described above is used, however, driving skill can be more precisely evaluated in consideration of the workload performed by the driver on the vehicle. In order to more precisely evaluate driving skill, it is preferred to use the work rate waveform or the operation quantity evaluation waveform described above for calculation of the operation quantity information. To configure the apparatus for evaluating driver's skill in a simpler configuration at low cost, the operation quantity information is calculated by using solely the steering angle waveform described above.

The physical load measurement means 30 includes detection sensors 32 and 34 for detecting myoelectric potentials of the left and right deltoid muscles of the driver 12, an electrode 36, an amplifier 38 for amplifying the myoelectric potentials detected by the detection sensors 32 and 34, and a physical load quantity calculating section 39. The physical load quantity calculating section 39 processes a waveform representing a time variation in each of the myoelectric potentials (amplified myoelectric potentials) of the left and right deltoid muscles to obtain information indicating the degree of physical load (physical load quantity information) placed on the driver 12 during a driving operation activity.

The detection sensor 32 detects a myoelectric potential of the left deltoid muscle of the driver, and is composed of a pair of Ag/AgCL plate-like electrodes. The pair of plate-like electrodes are attached to the surface of the left shoulder in which the deltoid muscle is positioned, in spaced apart relation each other at a given distance of several mm, for example, 5 mm. The detection sensor 34 detects a myoelectric potential of the right deltoid muscle of the driver, and is composed of a pair of Ag/AgCL plate-like electrodes as in the case of the detection sensor 22. The pair of plate-like electrodes are attached to the surface of the left shoulder in which the deltoid muscle is positioned, in spaced apart relation each other at a given distance of several mm, for example, 5 mm.

The electrodes of each of the detection sensors 32 and 34 are not limited to Ag/AgCL electrodes and may be formed of other materials such as Ag or stainless.

Figure 4:
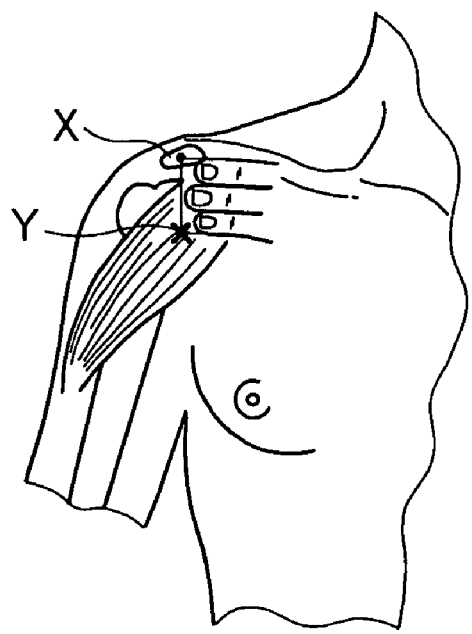
FIG. 4 is a view for explaining a position of attachment of physical load measurement means of the apparatus shown in FIG. 2 on the driver.

The attachment of the electrodes to the skin surface of the driver includes rubbing the skin surface using a scrub, removing contamination therefrom by using alcohol, and using an electrode glue. At this time, contamination is removed until an electrode resistance drops to 30 k$\Omega$ or less (preferably, 5 k$\Omega$). The two electrodes are attached to the bellies of the muscles to be measured in parallel relation to the muscle fibers. The electrodes are attached, as shown in FIG. 4, at a position Y spaced apart in a longitudinal direction of the arm from an outer end X of the clavicle by the width of three fingers to have a given distance therebetween.

On the other hand, the electrode 36 is an earth electrode to be attached to the earlobe of the driver, which is an electrically inactive position, to maintain the potential of the driver constant. The electrode 36 is provided for precise measurement by the detection sensors 32 and 34. The electrode 36 connected to the amplifier 38 is grounded via the amplifier 38.

The amplifier 38 is a well-known operational amplifier for amplifying the myoelectric potentials detected by the detection sensors 32 and 34, and is connected to the detection sensors 32 and 34 via a lead wire.

The myoelectric potentials detected by the detection sensors 32 and 34 and amplified are transmitted to the physical load quantity calculating section 39.

The physical load quantity calculating section 39 samples the time-series data of the myoelectric potentials of the two deltoid muscles to generates the myoelectric potential waveforms. The physical load quantity calculating section 39 then uses the obtained myoelectric potential waveforms to calculate time-series physical load quantity information. The physical load quantity calculating section 39 samples the myoelectric potentials detected by the detection sensors 32 and 34 and amplified by the amplifier 38 and then performs full-wave rectification thereon. Thereafter, the physical load quantity calculating section 39 smoothes the myoelectric potentials by using a smoothing filter (low-pass filter) to obtain a smoothed myoelectric potential waveform for each of the right and left deltoid muscles.

Figure 3B:
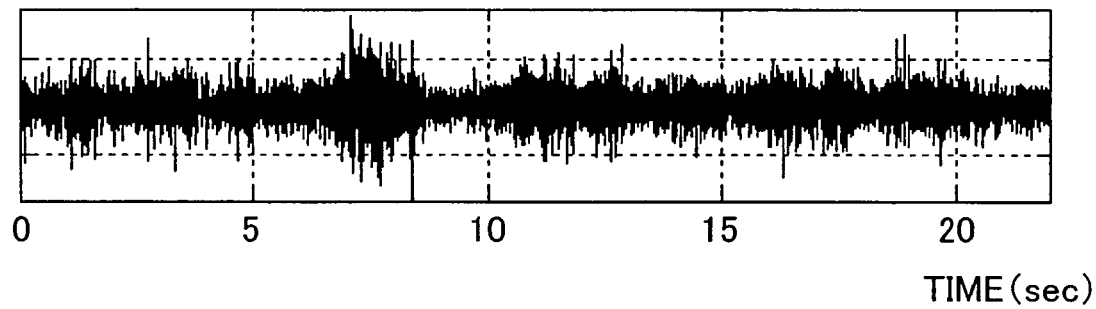
Figure 3C:
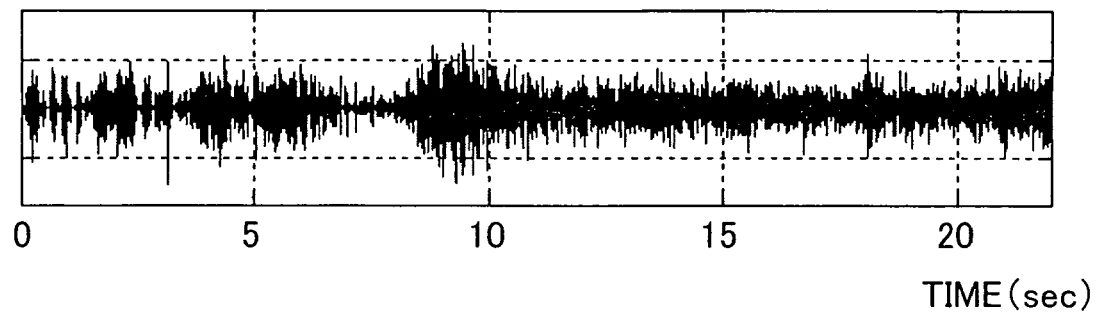

FIGS. 3B and 3C show the myoelectric potential waveforms of the left and right deltoid muscles, corresponding to the steering angle waveform shown in FIG. 3A (waveforms before smoothening). FIGS. 3A to 3C show that the steering angle of the steering wheel 16 of the vehicle 11 varies in accordance with each of the activities of the left and right deltoid muscles of the driver 12. In other words, the myoelectric potential at each of the left and right deltoid muscles of the driver 12 varies in accordance with a variation in quantity of driving operation by the driver 12.

The myoelectric potentials of the left and right deltoid muscles of the driver 12 indicate the degrees of load placed on the left and right deltoid muscles, respectively, and therefore, the degree of physical load on the driver 12. As can be seen from the comparison between FIGS. 3A to 3C, the degree of physical load on the driver 12 does not necessarily correspond to the quantity of driving operation by the driver 12. This is because the load placed on each of the left and right deltoid muscles of the driver 12 is not caused necessarily by the driving operation activity of the driver 12. For example, when the driver 12 gets tensed up, a larger excessive force is applied to the body of the driver 12 and the physical load on the driver 12 becomes larger as compared with the case where the driver 12 is relaxed. It is apparent that the driver is judged to have higher driving skill when he/she can perform a driving operation in a more relaxed state under less physical and mental loads. Specifically, as the driving skill of the driver becomes higher, a less excessive physical load other than the physical load required for the driving operation activity is not placed on the driver who drives a vehicle. The present invention is devised based on the consideration as described above.

The apparatus for evaluating the driving skill of the driver according to the present invention calculates an evaluation value indicating the efficiency of the physical load on the driver 12 to the driving operation activity performed by the driver 12 as an evaluation value which quantitatively indicates the degree of excessive physical load on the driver 12 other than the physical load required for the driving operation activity of the vehicle 11, as described below. In this embodiment, the efficiency of the physical load corresponds to a ratio of the workload (driving operation quantity) performed by the driver 12 on the vehicle 11 in the driving operation activity of the vehicle 11 to the degree of the physical load on the driver 12.

The measurement of the degree of physical load on the driver 12 is not limited to the measurement of the myoelectric potentials described above. For example, muscle sound information directly representing a vibration of a muscle, which is caused due to the driving operation activity, may be measured instead.

The signals of the myoelectric potentials before smoothing as shown in FIGS. 3B and 3C are signals, each containing a high-frequency component essentially generated when the muscle contracts. As shown in FIG. 3A, however, the waveform of the steering angle of the steering wheel 16 by the driver 12 does not contain a high-frequency component (for example, the same is applied to the work rate waveform). Therefore, the myoelectric potential waveform is smoothed after being subjected to full-wave rectification to correspond to a force generated by the contraction of the muscle.

Then, the physical load quantity calculating section 39 calculates a root means square (RMS) value for each of the left and right myoelectric potential waveforms from the left and right myoelectric potential waveforms, respectively. More specifically, in this embodiment, for each of the myoelectric potential waveforms of the left and right deltoid muscles, a mean value (simple arithmetic mean value) is obtained for each predetermined period of time. Then, for each of the myoelectric potential waveforms of the left and right deltoid muscles, a waveform representing a deviation of the myoelectric potential waveform from the average value (load quantity evaluation waveform) is generated for each predetermined period of time. Then, the RMS value is obtained for each of such the left and right load quantity evaluation waveforms for each predetermined period of time. Thereafter, the RMS value of each of the left and right load quantity evaluation waveforms, which is subjected to a geometric averaging process for each period of time, is calculated as physical load quantity information indicating the degree of physical load on the driver 12 in the driving operation activity of the vehicle 11 for each predetermined period of time. The RMS value is a root means square (square-root of sum of squares) of the myoelectric potential waveform in a predetermined period of time. The predetermined period of time corresponds to a predetermined period in the calculation of the operation quantity information described above (for example, 3.0 seconds). The average processing is not limited to the geometric averaging process and may also be a normal averaging (simple addition mean) process. In the present invention, however, the geometric averaging process is more suitable in view of precision. The calculated physical load quantity information for each predetermined period of time is supplied to the data processing means 40.

The data processing means 40 includes an evaluation value calculating section 42, a driving skill level judging section 44, a memory 46 and a CPU 48. The data processing means 40 is a computer including the sections, each of which functions by the execution of programs stored in the memory 46 by the CPU 48. The physical load quantity information for each predetermined period of time transmitted from the load measurement means 20 and the operation quantity information for each predetermined period of time transmitted from the operation quantity measurement means 30 are both stored in the memory 46 of the data processing means 40. An input device (not shown) is connected to the data processing means 40. The operation of the input device by an operator allows an evaluation time range, an evaluation reference value and the like described below to be changed.

The evaluation value calculating section 42 invokes the physical load quantity information and the operation quantity information stored in the memory 46 to calculate an evaluation value within a predetermined time range (evaluation time range) during the driving based on the invoked information. The evaluation value to be calculated represents the efficiency of the physical load on the driver to the driving operation activity performed by the driver 12 within a predetermined time range, and corresponds to a ratio of the quantity of driving operation by the driver 12 to the degree of physical load on the driver 12. As described above, the memory 46 stores the physical load quantity information for a predetermined period of time (for example, three seconds) described above and the operation quantity information for a predetermined period of time described above. The evaluation value calculating section 42 uses these pieces of information to calculate an evaluation value within a predetermined time range (for example, fifteen seconds). The evaluation value calculating section 42 calculates, for example, an integrated value (integrated load quantity value) of the above-mentioned physical load quantity information over a predetermined time range as the degree of physical load on the driver 12 within the predetermined time range. The evaluation value calculating section 42 also calculates, for example, an integrated value (integrated operation value) of the above-mentioned operation quantity information over the predetermined time range as the quantity of driving operation by the driver 12 within the predetermined time range. Then, the evaluation value calculating section 42 calculates a ratio of the integrated operation value to the integrated load value as an evaluation value indicating the efficiency of the physical load on the driver.

In the present invention, the evaluation value is not limited to the ratio of the integrated operation value to the integrated load value described above. The evaluation value in the present invention may be any value indicating the efficiency of the physical load on the driver 12 to the driving operation activity performed by the driver 12 and therefore is not particularly limited. For example, a value obtained by subtracting the integrated load value from the integrated operation value may be used as the evaluation value. Even in this case, it can be said that the evaluation value indicates the degree of efficiency of the physical load on the driver 12 to the driving operation activity performed by the driver 12 by a difference between the integrated load value and the integrated operation value.

The driving skill level judging section 44 compares the evaluation value calculated by the evaluation value calculating section 42 and a preset evaluation reference value with each other to judge the driving skill level of the driver 12. The evaluation reference value is, for example, preset by the above-described input device (not shown). For example, as in the case where the driving skill level of the driver 12 is desired to be judged when the driver 12 drives the vehicle 11 and the vehicle 11 runs on a specific road and the like, the evaluation value (efficiency of the physical load on the driver) obtained when a predetermined driver having standard driving skill drives the vehicle 11 to run on the specific road is set as the evaluation reference value. The evaluation value (efficiency of the physical load on the driver) when the driver 12 drives the vehicle 11 to run on the specific road is calculated to be compared with the above-described evaluation reference value, thereby making it possible to judge the driving skill level of the driver 12. In this case, the above-described predetermined time range may be set equal to a total time of running on the specific road. For example, when the evaluation value of the driver 12 is smaller than the evaluation value of the predetermined driver having standard driving skill, the driving skill level of the driver 12 is judged to be insufficient. When the evaluation value of the driver 12 is larger than the evaluation value of the predetermined driver having standard driving skill, the driving skill level of the driver 12 is judged as advanced. A plurality of evaluation reference values may be set. For the number of judgment levels, the number of levels is not limited. For example, there can be set an insufficient level, an intermediate level, an advanced level, and a most-advanced level. Such a result of judgment is displayed on the monitor 52 connected to the data processing means 40. The monitor 52 is provided, for example, as shown in FIG. 1, for the vehicle 11 at the position which allows the driver 12 to check the display while driving. In this manner, the driver 12 can check his/her own driving skill as required.

The apparatus for evaluating the driving skill of the driver according to the present invention does not necessarily include the driving skill level judging section.

For example, when the driving skill of the driver 12 in accordance with the condition of a road is desired to be evaluated, the driver 12 drives the vehicle 11 in advance to store a standard evaluation value obtained when the driver 12 drives on a predetermined standard road in the memory 46. The standard road may be a straight pavement road with a dry surface or the like, which allows any driver to drive with ease and without any stress regardless of the driving skill level. Then, the evaluation values in the case where the driver 12 drives the vehicle 11 on roads in different conditions, for example, a twisting mountain road, an urban area where traffic is heavy, a very bumpy lane and the like are calculated. For each of the evaluation values, an index with respect to the standard evaluation value is calculated. In this case, the above-mentioned predetermined time range is set to the length of time during which the driver 12 drives on the road in each road surface state. The index indicates the degree of change in the driving skill of the driver 12 under each road condition with respect to the driving skill of the driver 12 when the driver drives on a predetermined road. The driving skill evaluation apparatus according to the present invention may evaluate the driving skill of the driver based on such the index with respect to each road surface state.

As described above, the apparatus for evaluating driving skill according to the present invention can qualitatively and quantitatively evaluate the driving skill of the driver 12 in accordance with various states by varying the evaluation value serving as a reference for the evaluation.

Moreover, in the apparatus for evaluating driving skill according to the present invention, the evaluation value is not necessarily required to be calculated. For example, in the evaluation value calculating section 42, a scatter diagram showing a relation between the degree of physical load on the driver 12 and the quantity of driving operation by the driver 12 is created with the degree of physical load on the driver 12 and the quantity of driving operation by the driver 12 being indicated on the respective axes. The driving skill of the driver 12 may be evaluated based on the scatter diagram as described above.

For example, when the driving skill of the driver 12 in accordance with the condition of a road is desired to be evaluated, for example, the integrated load value (the degree of physical load on the driver 12) and the integrated operation value (the quantity of driving operation by the driver 12) when the driver 12 drives the vehicle 11 to run on the predetermined standard road are calculated in advance, as described above. Then, the integrated load value and the integrated operation value are calculated for each of the cases where the driver 12 drives the vehicle 11 on roads in different conditions, for example, a twisting mountain road, an urban area where traffic is heavy, a very bumpy lane and the like. Then, a scatter diagram showing a relation between the integrated operation value and the integrated load value for each road condition is created. Furthermore, on the scatter diagram, a point (standard point) indicating the relation between the integrated operation value and the integrated load value in the case where the driver 12 drives on a predetermined standard road is plotted on the scatter diagram, and then, the scatter diagram is output.

Figure 5:
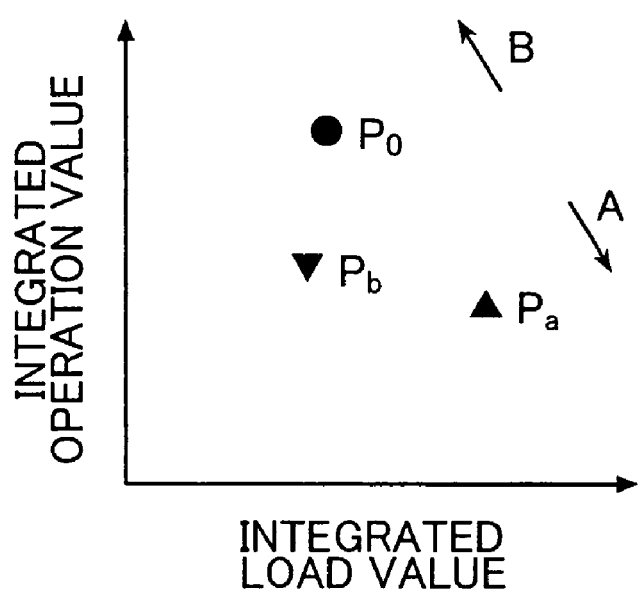
FIG. 5 is an example of a scatter diagram showing a relation between an integrated operation value and an integrated load value of the driver, which is created in the apparatus shown in FIG. 2.

FIG. 5 is an example of a scatter diagram showing the relation between the integrated operation value and the integrated load value of the driver 12, which is created by the apparatus for evaluating the driving skill of the driver according to the present invention. A point $P_0$ shown in FIG. 5 is a point (standard point) which represents the relation between the integrated load value (the degree of physical load on the driver 12) and the integrated operation value (the quantity of driving operation by the driver 12) when the driver 12 drives the vehicle 11 on the predetermined standard road. A point $P_a$ shown in FIG. 5 is a point which represents the relation between the integrated operation value and the integrated load value, for example, when the driver 12 drives the vehicle 11 on the mountain road. A point $P_b$ shown in FIG. 5 is a point which represents a relation between the integrated operation value and the integrated load value, for example, when the driver 12 drives the vehicle 11 through an urban area. In the scatter diagram of FIG. 5, a point situated in a direction indicated by the arrow A shown in FIG. 5 represents lower efficiency of the physical load (for example, a smaller value of the integrated operation value/the integrated load value), whereas a point situated in a direction indicated by the arrow B represents higher efficiency of the physical load (for example, a larger value of the integrated operation value/the integrated load value). In the example shown in FIG. 5, the driving skill of the driver 12 exhibits the highest driving skill when the driver 12 drives on the predetermined standard road indicated by the point $P_0$. Then, the driving skill of the driver 12 is the second highest when the driver 12 drives through the urban area indicated by the point $P_b$. The driving skill of the driver 12 is the lowest when the driver 12 drives on the mountain road indicated by the point $P_a$. Such the scatter diagram allows the driver 12 to qualitatively and quantitatively recognize the driving skill of the driver 12 under various conditions. For example, the evaluation value calculating section 42 of the data processing section 40 judges and outputs the driving skill level of the driver 12 in accordance with a relative positional relation between the point representing the relation between the integrated operation value and the integrated load value of the driver 12 in the scatter diagram mentioned above and a predetermined judgment area in the scatter diagram. The judgment area in the scatter diagram may be set to be an area in accordance with the road on which the driver drives the vehicle as described above. Alternatively, the judgment area may be set to be an area in accordance with the vehicle that the driver drives. For example, the judgment area may be preset in accordance with each of the points (standard points), each representing the relation between the integrated load value (the degree of physical load on the driver 12) and the integrated operation value (the quantity of driving operation by the driver 12), when the driver 12 drives a plurality of different types of vehicles.

Figure 6:
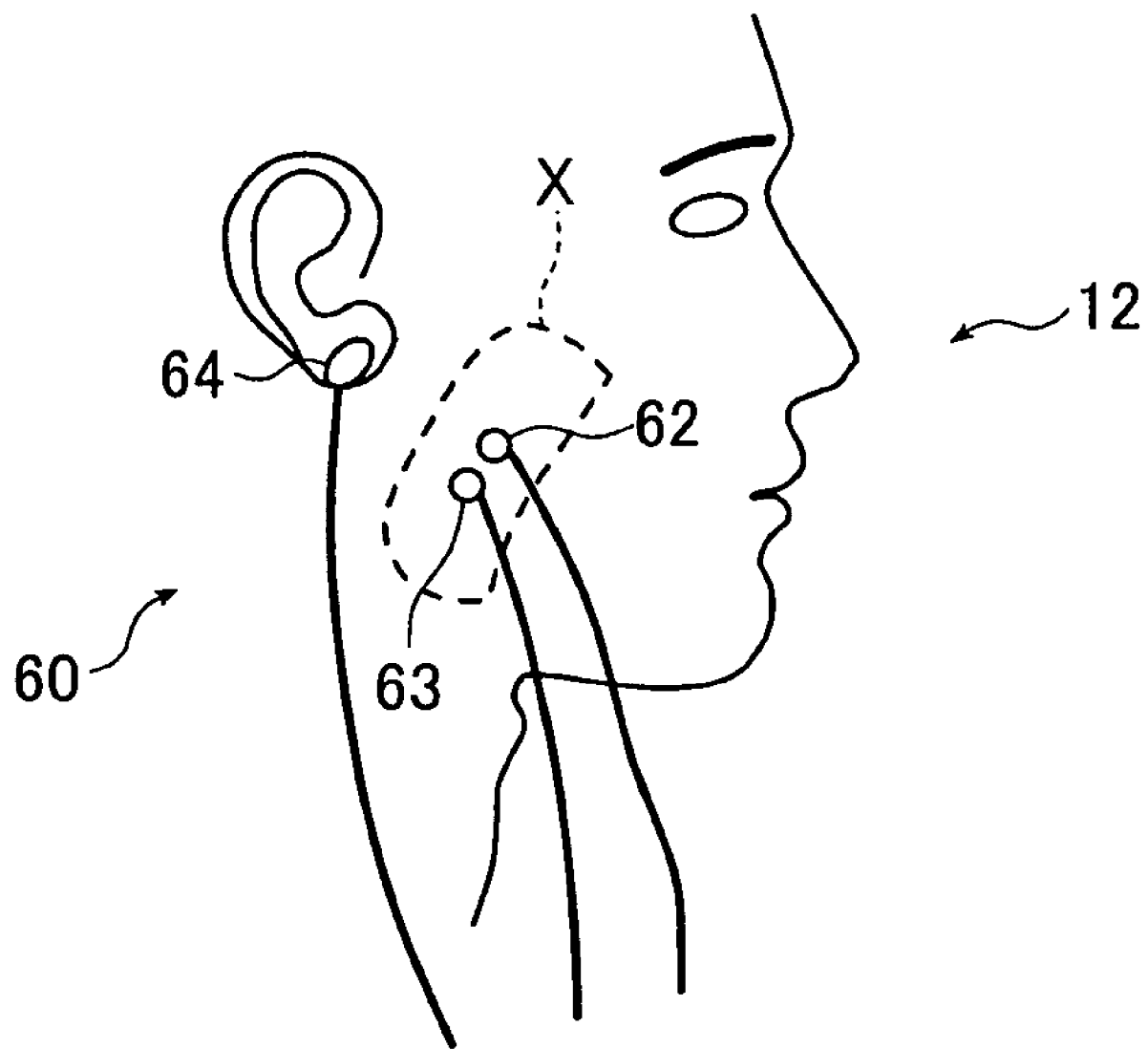
FIG. 6 is a view for explaining masseter muscle myoelectric potential measurement means for measuring a mental quantity of the driver during the driving, the mental quantity being used in another example of the apparatus for evaluating the driving skill of the driver according to the present invention.

The apparatus for evaluating the driving skill of the driver according to the present invention may also use, for example, information of a mental quantity indicating a mental state of the driver 12 during the driving in addition to the operation quantity information and the physical load information mentioned above to evaluate the driving skill of the driver. The information of the mental quantity specifically indicates the degree of a mental load placed on the driver 12 in the driving operation activity. In this case, for example, activity information of a masseter muscle of the driver 12 is obtained by masseter myoelectric potential measurement means 60 as shown in FIG. 6. Then, for example, the data processing means 40 obtains the activity information of the masseter muscle as described above to obtain the mental quantity indicating a mental state of the driver 12 during the driving. As in the case of the myoelectric potential sensor described above, the masseter myoelectric potential measurement means 60 includes electrodes 62 and 63 placed about 5 mm apart from each other and an earth electrode 64 for establishing a reference potential. The electrodes 62 and 63 are attached to a skin surface of an upper part of a masseter muscle X (indicated by a broken line) of a face F, whereas the earth electrode 64 is attached to the earlobe. In this manner, the potential at the masseter muscle of the driver 12 during the driving is obtained. The masseter muscle, which is a large muscle present on a side of the face, is called a chewing muscle together with a temporal muscle, and works on the actions of closing jaws, e.g., chewing and speaking actions. Accordingly, the masseter muscle does not normally move during a work activity such as driving an automobile performed by using muscles in arms, legs and the like. If a mental load develops in the driver 12 and causes him (her) to tense all over, however, a "strain" also develops in the masseter muscle. By the measurement of the myoelectric signal of the masseter muscle when the mental load develops in time series, the degree of mental load placed on the driver 12 can be measured in time series. The apparatus for evaluating the driving skill of the driver according to the present invention performs the same process on, for example, the time-series potential of the masseter muscle (masseter muscle waveform) measured in the above-mentioned manner as that performed on the potentials of the deltoid muscles described above to calculate an RMS value of the masseter muscle waveform (mental load quantity information) for each predetermined period of time. Then, as the degree of mental load on the driver 12 within a predetermined time range, for example, an integrated value of the mental load quantity information (mental integrated load quantity value) over the predetermined time range is calculated. Then, the evaluation value calculating section 42 may use the obtained mental load quantity information to evaluate the driving skill of the driver 12. For example, the mental integrated load quantity value itself may be used as the evaluation value to judge the driving skill level of the driver 12 under each situation as described above. Alternatively, the driving skill under each situation may be indicated by an index. The means of calculating the mental quantity is not limited to the measurement of the potential of the masseter muscle described above. For example, a value of the mental quantity may be calculated from the result of measurement of, for example, heartbeats, sweating, a brain blood flow and a face temperature of the driver 12 and the like.

Figure 7:
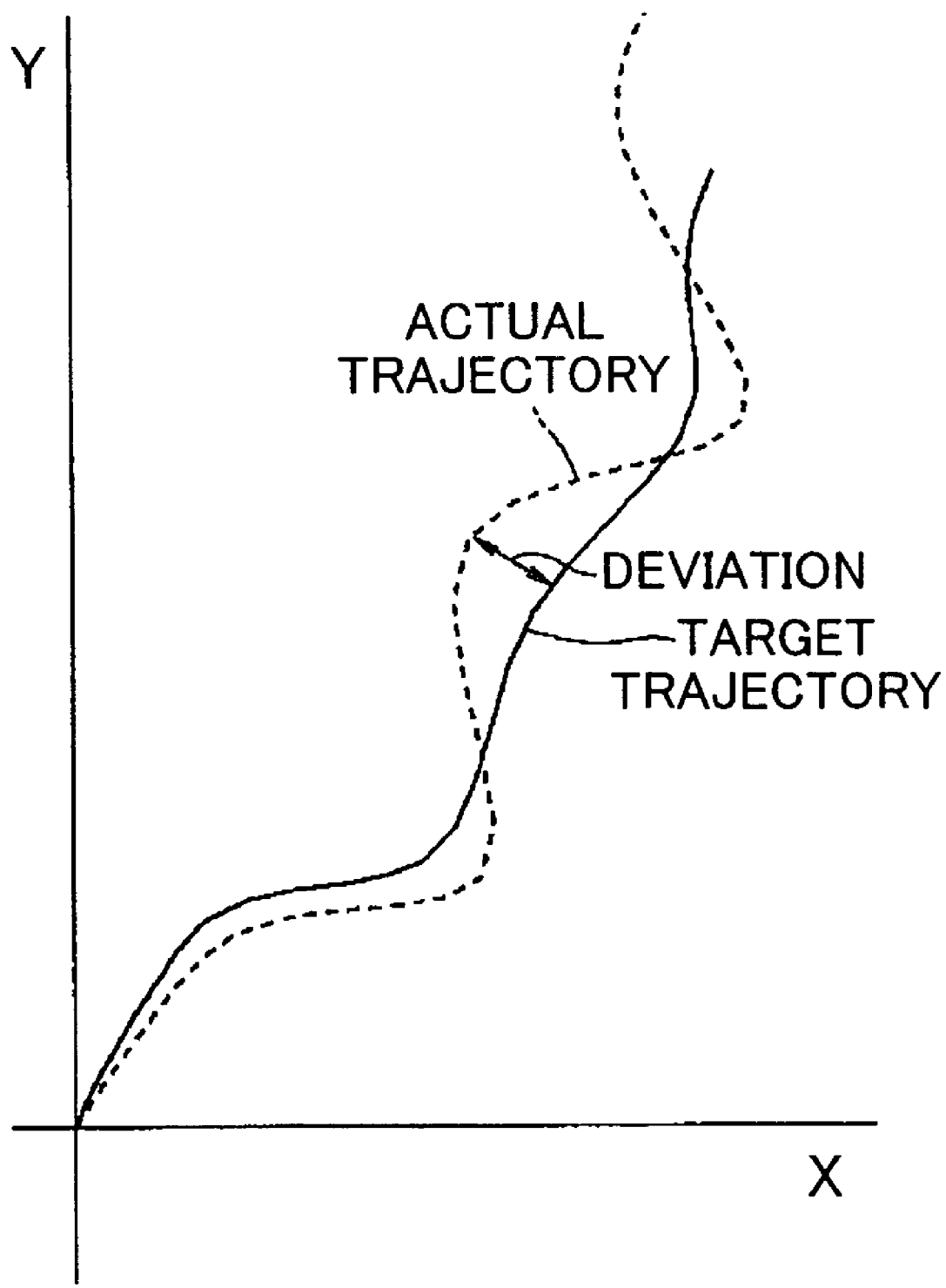
FIG. 7 is a graph for explaining a value of deviation of a trajectory of the vehicle from a target trajectory, the value of deviation being an example of a running state quantity indicating a running state of a vehicle driven by the driver, and the running state quantity being used in another example of the apparatus for evaluating the driving skill of the driver according to the present invention.

Moreover, the apparatus for evaluating the driving skill of the driver according to the present invention may also use, for example, a running state quantity indicating a running state of the vehicle 11 driven by the driver 12 to evaluate the driving skill of the driver 12. For example, as shown in FIG. 7, the driver 12 drives the vehicle 11 to run along a predetermined course (target trajectory). Then, information on an actual running trajectory (actual trajectory) of the vehicle 11 driven by the driver 12 in this case as shown in FIG. 7 is obtained. Then, a value of a deviation of the actual trajectory from the target trajectory is used as a running state quantity. Such the deviation can be easily calculated from the actual trajectory measured by the GPS sensor 15c provided for the vehicle 11 and the predetermined target trajectory. For example, the data processing means 40 obtains such information on the actual trajectory measured by the GPS sensor 15c and compares the obtained information with the information on the target trajectory prestored in the memory 46 to obtain the running state quantity (the value of the deviation). For example, the evaluation value calculating section 42 of the data processing means 40 may use the running state quantity itself as the evaluation value to judge the driving skill level of the driver 12 under each situation as described above or may indicate the driving skill under each situation by an index.

The mental quantity or the running state quantity described above may be independently treated as evaluation values. Moreover, total points obtained by adding the index obtained from the physical load quantity information and the operation quantity information to the index of the mental quantity or the running state quantity may be used to comprehensively evaluate the driving skill of the driver 12.

The data processing means 40 may correct the result of evaluation depending on, for example, the ambient environment when the vehicle 11 runs. For example, the result of evaluation may be corrected in accordance with weather (fair, light rainy, heavy rainy, foggy, snowy or the like), a road surface condition (dry, wet, icebound or the like), a traffic condition (traffic jam, smooth traffic flow or the like) and a speed (high-speed driving, low-speed driving or the like) when the vehicle 11 runs. For example, in a case of rain or snow, an actual result of evaluation is corrected to evaluate the driving skill level higher than usual. The amount of correction is determined based on, for example, a database indicating the amount of correction for each ambient environment, which is stored in the memory 46 of the data processing means 40. It is preferred that the amount of correction for each ambient environment is determined for each evaluation value (the evaluation value obtained from the physical load quantity information and the operation quantity information, the evaluation value obtained from the mental load quantity information, and the evaluation value obtained from the running state quantity).

In general, as the driver's driving skill becomes higher, the motion of the driver in the driving operation activity and the behavior of the vehicle in accordance with the driving operation activity become smoother. The apparatus for evaluating driver's skill according to the present invention may correct the result of evaluation of the driving skill in accordance with the degree of smoothness. For example, the data processing means 40 may obtain information on the smoothness of the driving motion by the driver 12 or the smoothness of the behavior of the vehicle 11 to correct the result of evaluation of the driving skill in accordance with the degree of smoothness. The smoothness of the driving motion by the driver 12 can be obtained from the time-series data of the driving motion by the driver 12, which is detected by the driving motion information acquisition sensor such as the brake pressure sensor 13$a$ or the throttle sensor 13$b$ provided for the vehicle 11. The smoothness of the behavior of the vehicle 11 can be obtained from the time-series data of various types of behavior of the vehicle 15, which is detected by the yaw rate sensor 15$a$, the vehicle speed sensor 15$b$ and the GPS sensor 15$c$ provided in the vehicle 11. The evaluation value calculating section 42 of the data processing means 40 corrects the result of evaluation so that the driving skill of the driver is evaluated higher as a value of the smoothness becomes larger.

Figure 8:
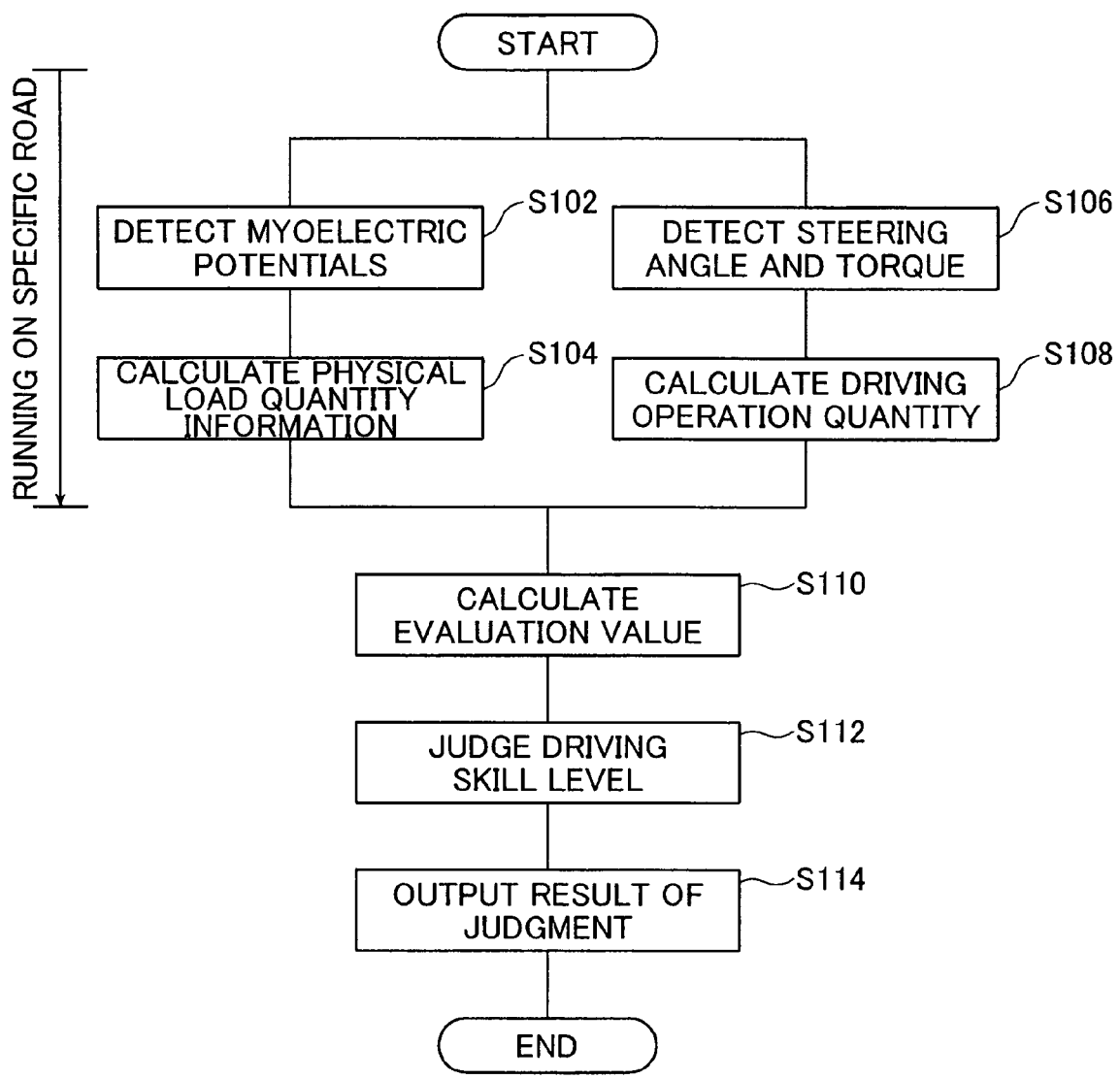
FIG. 8 is a flowchart of an example of the apparatus for evaluating the driving skill of the driver according to the present invention.

The method of evaluating the driving skill of the driver according to the present invention, which is executed by using the evaluation apparatus 10 as described above, will be described. Hereinafter, the case where the driving skill level of the driver 12 is to be judged when the driver 12 drives the vehicle 11 to run on the specific road will be described. First, the memory 46 of the data processing means 40 prestores the evaluation reference value. The evaluation reference value corresponds to the evaluation value (efficiency of the physical load on the driver) when a predetermined driver having standard driving skill drives the vehicle 11 to run on the specific road. On the surfaces of the shoulders in which the deltoid muscles of the driver 12 are positioned, the detection sensors 32 and 34 and the electrode 36 are attached in advance. FIG. 8 is a flowchart of the driving skill evaluating method as described above.

Upon the start of judgment of the driving skill of the driver 12, the physical load measurement means 30 starts the detection of the myoelectric potentials of the left and right deltoid muscles of the driver 12 in time series as described above (Step S102). The time-series data of the myoelectric potentials of the left and right deltoid muscles are sampled by the physical load quantity calculating section 39 to generate the myoelectric potential waveforms. The physical load quantity calculating section 39 uses the myoelectric potential waveforms to calculate the physical load quantity information in time series (for each predetermined period of time) as described above (Step S104). Upon the start of judgment of the driving skill of the driver 12, simultaneously with the start of detection of the myoelectric potentials at the deltoid muscles, the operation quantity measurement means 20 detects the steering angle in time series and the torque in time series (Step S106). The time-series steering angle data and the time-series torque data are sampled by the physical load quantity calculating section 39 to generate the steering angle waveform and the torque waveform. Then, the physical load quantity calculating section 39 uses the steering angle waveform and the torque waveform to calculate the operation quantity information in time series (for each predetermined period of time) described above (Step S108). The physical load quantity information and the operation quantity information for each predetermined period of time are stored in the memory 42 of the data processing section 40. The physical load quantity information and the driving operation quantity information are obtained and stored in a continuous manner at least over a time range in which the vehicle 11 runs on the specific road described above.

When the vehicle 11 finishes running on the specific road, the data processing is performed by the data processing means 40 for the physical load quantity information and the operation quantity information in the time range. First, the evaluation value calculating section 42 calculates, for example, the integrated load quantity value as the degree of physical load on the driver 12 within a predetermined time range. The evaluation value calculating section 42 also calculates, for example, the integrated operation quantity value as the quantity of driving operation by the driver 12 within a predetermined time range. Then, a ratio of the integrated operation value to the integrated load value as the evaluation value indicating the efficiency of the physical load on the driver 12 within a predetermined time range (Step S110). Then, the driving skill level judging section 44 compares the evaluation value and the preset evaluation reference value described above with each other to judge the driving skill level of the driver 12 when the driver 12 drives the vehicle 11 to run on the specific road (Step S112). Then, the result of judgment is displayed on the monitor 52 and is output (Step S114). The method of evaluating the driving skill according to the present invention is carried out in the above-described manner.

Figure 9:
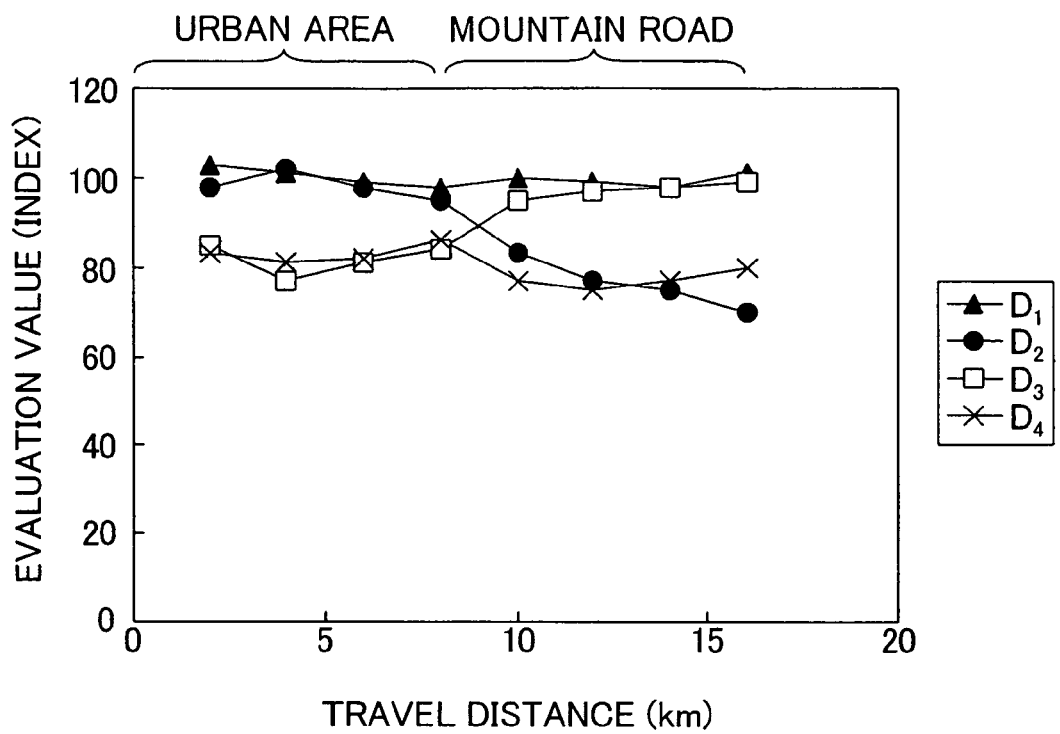
FIG. 9 shows an example of the result of evaluation by a method for evaluating the driving skill of the driver according to the present invention, which is outputted from the apparatus for evaluating the driving skill of the driver according to the present invention.
Figure 10:
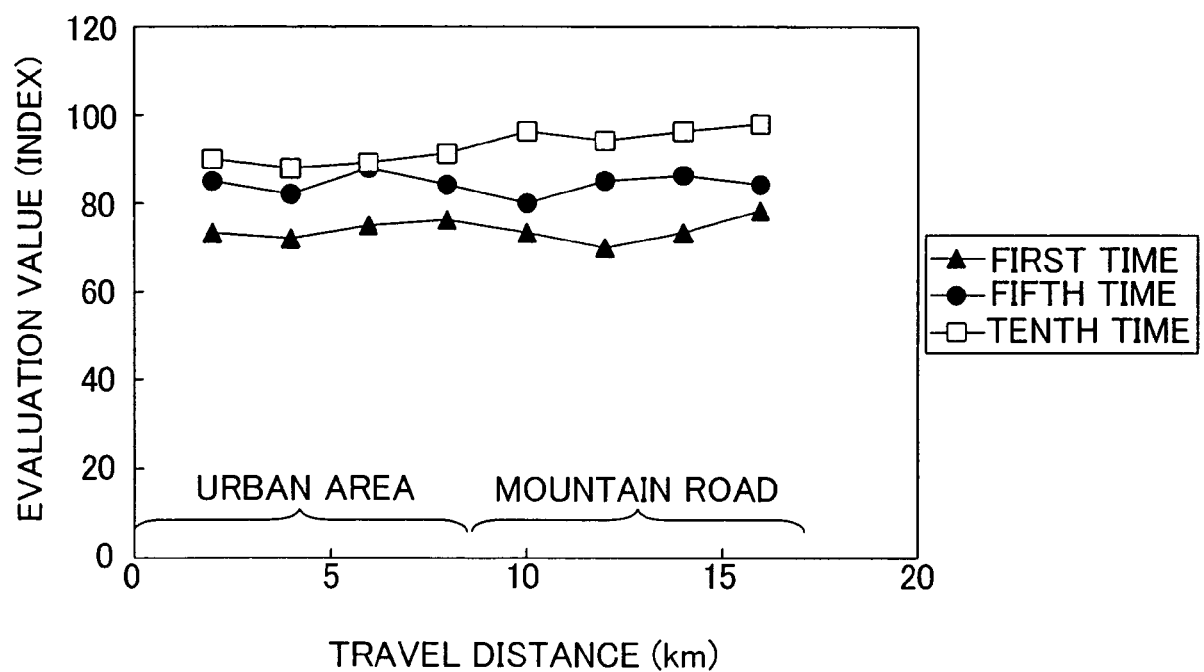
FIG. 10 shows another example of the result of evaluation by the method for evaluating the driving skill of the driver according to the present invention, which is outputted from the apparatus for evaluating the driving skill of the driver according to the present invention.

FIGS. 9 and 10 show an example of the result of evaluation by the method of evaluating the driving skill of the driver according to the present invention, which is output from the apparatus for evaluating the driving skill of the driver according to the present invention. FIG. 9 shows a variation in driving skill in accordance with road conditions. FIG. 9 shows a variation in driving skill in accordance with a road condition for each of a plurality of drivers $D_1$ to $D_4$. More specifically, the graph in FIG. 9 shows a variation in the result of evaluation showing the driving skill of each of the plurality of drivers $D_1$ to $D_4$ (that is, the evaluation value indicating the efficiency of the physical load on the driver) when each of the drivers $D_1$ to $D_4$ drives the same vehicle to run on the same road. The same road is divided into a plurality of zones in accordance with the running state. FIG. 9 shows the driving skill of each of the drivers for each zone and indicates the driving skill of each of the drivers for each zone by each index of the evaluation value for each zone. More specifically, for each of the drivers, the standard evaluation value calculated when each driver drives the same vehicle described above on a different road (a straight pavement with a dry surface, which allows any driver to drive with ease and without stress) is set to 100. The evaluation value of each of the drivers for each zone is indicated by the index. In FIG. 9, a ratio of the integrated operation value to the integrated load value is used as the evaluation value.

A total length of the road in FIG. 9 is 16 km. From the driving start point (0 km) to the point of 8 km, the road is in an urban area where traffic is relatively heavy. From the point of 8 km to the point of 16 km, the road is a twisting mountain road where traffic is relatively light. The same road is divided into a plurality of (herein, eight) zones, each being 2 km long. In FIG. 9, the evaluation value is calculated for a time range in which each of the drivers $D_1$ to $D_4$ drives each of the plurality of zones. Each evaluation value is indicated by the index (based on the reference evaluation value of 100). From FIG. 9, a variation in driving skill in accordance with a road condition can be recognized for each of the drivers $D_1$ to $D_4$ when each of the drivers drives the same vehicle to run on the same road described above. For example, it can be judged that the driver $D_1$ has globally high driving skill that does not vary depending on whether the road is in the urban area or the mountain road. The driver $D_2$ can be judged as being a driver who has high driving skill for driving in the urban area but has insufficient driving skill on the mountain road, that is, relatively low driving skill for driving on the mountain road. The driver $D_3$ can be judged as being a driver who has high driving skill for driving on the mountain road but has insufficient driving skill in the urban area, that is, relatively low driving skill for driving in the urban area. The driver $D_4$ can be judged as being a driver who has insufficient driving skill both for driving in the urban area and for driving on the mountain road. According to the method of evaluating the driving skill of the driver according to the present invention, a variation in driving skill of the driver under a different road condition can be qualitatively evaluated.

FIG. 10 shows a variation in driving skill in accordance with the number of repetitions when the driver $D_5$ drives the same vehicle described above to repeat running on the same road described above for each number of repetitions. In FIG. 10, as the driving skill of each driver for each number of repetitions, the evaluation value calculated when the driver $D_5$ drives the same vehicle on the same road for each zone is indicated by the index as in the case of FIG. 9. As shown in FIG. 10, the driving skill of the driver $D_5$ becomes higher as the number of repetitions of driving increases. It is natural that the driving skill becomes higher when the driver repeats driving the same vehicle on the same road. Therefore, it can be confirmed that the driving skill evaluating method according to the present invention allows the evaluation of the driving skill of the driver in a suitable manner. According to the driving skill evaluating method of the present invention, the driving skill of an individual driver can be qualitatively and quantitatively evaluated as described above.

By using the driving skill evaluating apparatus according to the present invention, for example, the driver himself/herself can recognize his/her own driving skill under each running condition as the evaluation value, and can therefore recognize the type of road (e.g., the urban area or the mountain road) at which the driver has less skill, the type of vehicle (e.g., a compact vehicle such as a light vehicle or a large-size vehicle such as an RV vehicle) at which the driver has less skill, or the like. Moreover, the driving skill under each driving condition can be qualitatively and quantitatively evaluated. By using the driving skill evaluating apparatus according to the present invention for training of the driver, the result or the achievement of training can be precisely judged. For example, the driving skill evaluating apparatus according to the present invention can be suitably used for driving training of a driver in name only or the like who still feels uncomfortable in driving, for driving training of those who wish to obtain a commercial driver's license for a bus, taxi, and the like, for driving training under a bad condition such as on a snowy road or an icy road, for driving training of a beginner or the like who is unused to driving, for practice of motor sports or the like, for training a test driver, and the like.

It can be said that a running situation under which a predetermined driver is judged to have high driving skill is the situation under which the driver easily performs the driving operation activity. Specifically, the efficiency of the physical load on the driver to the driving operation activity performed by the driver (i.e., a ratio of the driving operation to the degree of physical load) under a predetermined condition also represents the facility of the driving operation activity under the condition. For example, if the evaluating apparatus 10 is used to calculate the evaluation value for each of the cases where the same driver drives a plurality of different vehicles on the same specific road, the facility of the driving operation (i.e., driving operability) for each of the plurality of different vehicles can be evaluated by using the evaluation value. The evaluation method may be carried out in the same manner as in the judgment of the driving skill described above. The apparatus for evaluating the driving skill of the driver according to the present invention also functions as an apparatus for evaluating the drivability of a vehicle.

Figure 11:
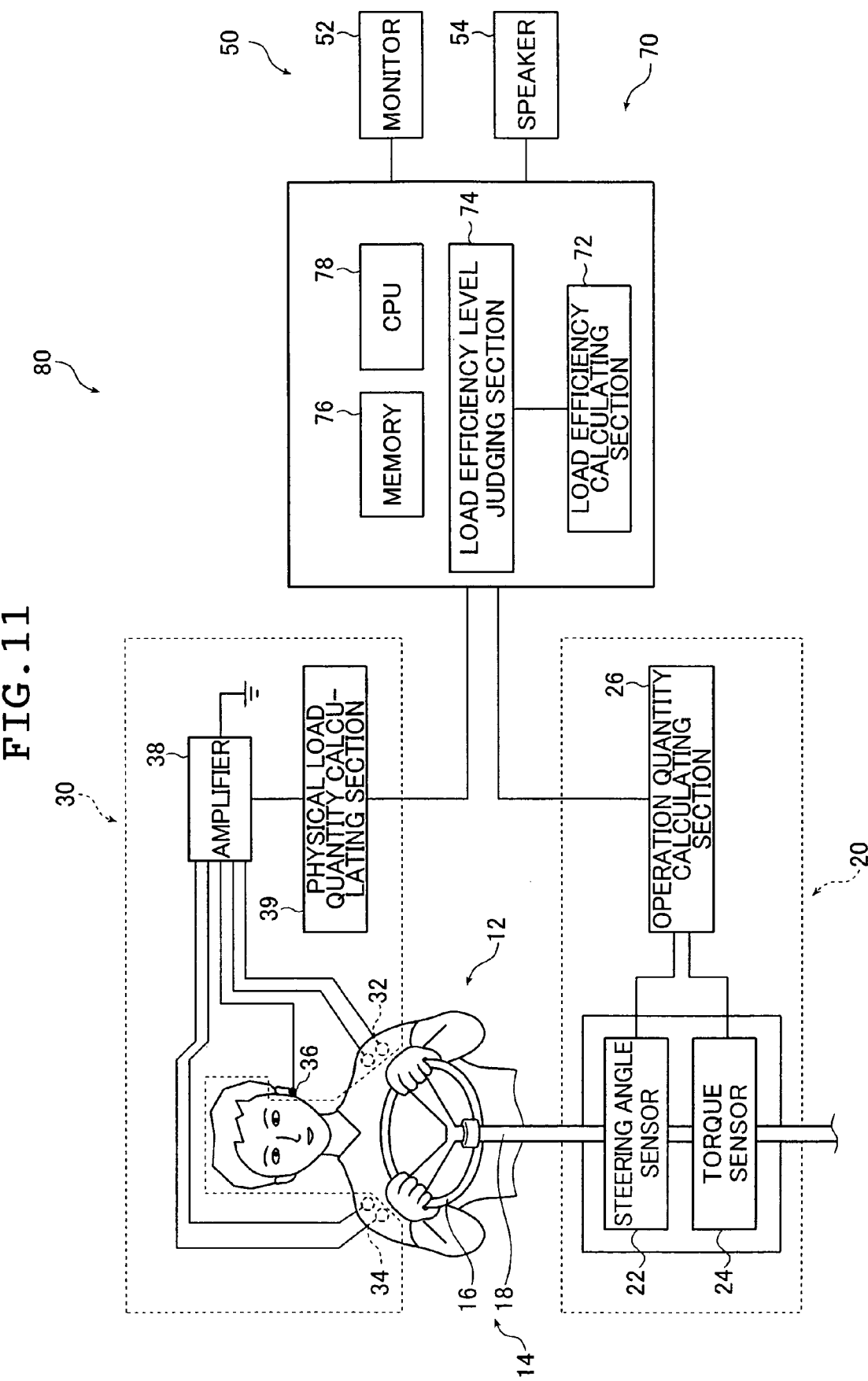
FIG. 11 is a schematic configuration view for explaining an example of the apparatus for informing the efficiency of the physical load of the driver to the driving operation according to the present invention.

Next, an apparatus for informing the efficiency of the physical load on the driver to the driving operation according to the present invention will be described. FIG. 11 is a schematic configuration view for explaining a load efficiency informing apparatus 80 provided for the vehicle 11, which corresponds to an example of the apparatus for informing the efficiency of the physical load on the driver to the driving operation according to the present invention. The load efficiency informing apparatus 80 partially has the same configuration as that of the evaluating apparatus 10. The load efficiency informing apparatus 80 includes the operation quantity measurement means 20, the load measurement means 30, data processing means 70, and informing means 50. The operation quantity measurement means 20 and the load measurement means 30 functions in the same manner as those of the evaluating apparatus 10. The load efficiency information apparatus 80 shares the operation quantity measurement means 20, the load measurement means 30 and the monitor 52 of the informing means 50 with the driver's skill evaluating apparatus 10. Therefore, the detailed description of the operation quantity measurement means 20 and the load measurement apparatus 30 is herein omitted.

The operation quantity measurement means 20 obtains information of the quantity of driving operation in time series (i.e., operation quantity information), which is performed by the driver 12 for the vehicle 11 as described above, and then outputs the obtained information to the data processing means 70. As an example of the operation quantity information, the RMS value of the operation quantity evaluation waveform or the work rate waveform is given. The load measurement means 30 obtains the physical load quantity information indicating the degree of physical load on the driver 12 in the driving operation activity and outputs the obtained information to the data processing means 70. As an example of the physical load quantity information, a value obtained by geometrically averaging the root means square (RMS) value of the load quantity evaluation waveform or the myoelectric potential waveform for each of the myoelectric potentials of the left and right deltoid muscles described above can be given. The operation quantity information and the physical load quantity information are obtained for each predetermined period of time (in the above-described example, 3.0 seconds) corresponding to each RMS value. Each time the information is obtained, the information is sequentially output to the data processing means 70.

The data processing means 70 includes a load efficiency calculating section 72, a load efficiency level judging section 74, a memory 76, and a CPU 78. The data processing means 70 is a computer including the sections, each of which functions by the execution of programs stored in the memory 76 by the CPU 78. The physical load quantity information transmitted from the load measurement means 30 and the operation quantity information transmitted from the operation quantity measurement means 20 are sequentially transmitted to the load efficiency calculating section 72. An input device (not shown) is connected to the data processing means 70. The operation of the input device by an operator allows an evaluation time range, an evaluation reference value, and the like described below to be changed.

The load efficiency calculating section 72 receives the physical load quantity information transmitted from the load measurement means 30 and the operation quantity information transmitted from the operation quantity measurement means 20 to calculate a load efficiency judgment value for each predetermined period of time (for example, 3.0 seconds) based on these pieces of information. The load efficiency judgment value calculated herein indicates the efficiency of the physical load on the driver to the driving operation activity performed by the driver 12. Specifically, the load efficiency calculating section 72 calculates a ratio of the quantity of driving operation by the driver 12 to the degree of physical load on the driver 12 as the load efficiency judgment value. In the present invention, for example, as the load efficiency judgment value, a value obtained by subtracting a value of the operation quantity information for each predetermined period of time from a value of the corresponding physical load quantity information for each predetermined period of time may be used. The load efficiency judgment value in the present invention may be any value as long as the efficiency of the physical load on the driver 12 within a predetermined period of time to the driving operation activity performed by the driver 12 is indicated, and therefore, is not particularly limited.

The load efficiency level judging section 74 compares the load efficiency judgment value calculated by the load efficiency calculating section 72 and a preset judgment reference value to judge whether or not the load efficiency judgment value of the driver 12 is lower than the criterion of judgment. The judgment reference value is, for example, preset by the above-described input device (not shown). For example, the load efficiency judgment value of a predetermined driver having standard driving skill when the driver drives the vehicle 11 to run on a specific road in a state where the vehicle 11 nearly drives out of the given road is set as the judgment reference value. As described above, a value of the efficiency of the physical load on the driver during the driving corresponds to the level of driver's skill. Under a situation where the value of the efficiency of the physical load on the driver becomes lower (specifically, under a situation, among a plurality of different situations where a given quantity of driving operation activity is performed, where the degree of physical load on the driver increases as compared with under the other situations), the driver can exhibit only low skill. In this case, the operation of the vehicle becomes difficult. As a result, the driver cannot drive the vehicle as expected. The load efficiency level judging section 74 sequentially compares the load efficiency judgment value sequentially calculated for each predetermined period of time and the evaluation reference value while the driver 12 is driving the vehicle 11 to sequentially judge whether or not the degree of physical load on the driver 12 is at a level to make the operation of the vehicle difficult.

The load efficiency level judging section 74 controls the operation of each of the monitor 52 and a speaker 54 of the informing means 50. The load efficiency level judging section 74 controls the operation of the informing means 50 to inform the driver 12 of the result of judgment in an informing mode in accordance with the result of judgment. For example, when the load efficiency judgment value of the driver 12 is equal to or larger than the judgment reference value, the load efficiency level judging section 74 transmits the load efficiency judgment value to the monitor 52 and displays the load efficiency judgment value on a screen of the monitor 52 to inform the current physical load efficiency of the driver 12. On the other hand, when the load efficiency judgment value of the driver 12 is smaller than the judgment reference value, the load efficiency level judging section 74 transmits the load efficiency judgment value to the monitor 52 and displays the load efficiency judgment value on a screen of the monitor 52 in a display mode different from a usual one (i.e., displays in a warning mode) such as display in a flashing manner. Simultaneously, a warning sound is emitted from the speaker 54 to inform the driver 12 that the degree of current physical load efficiency is at a level to make the operation of the vehicle difficult.

As in the case of the driving skill evaluating apparatus 10, the result of judgment may be corrected or the criterion of judgment may be changed by using a mental quantity, a running state quantity, an ambient environment, or a smoothness of the driving motion or the vehicle behavior.

Figure 12:
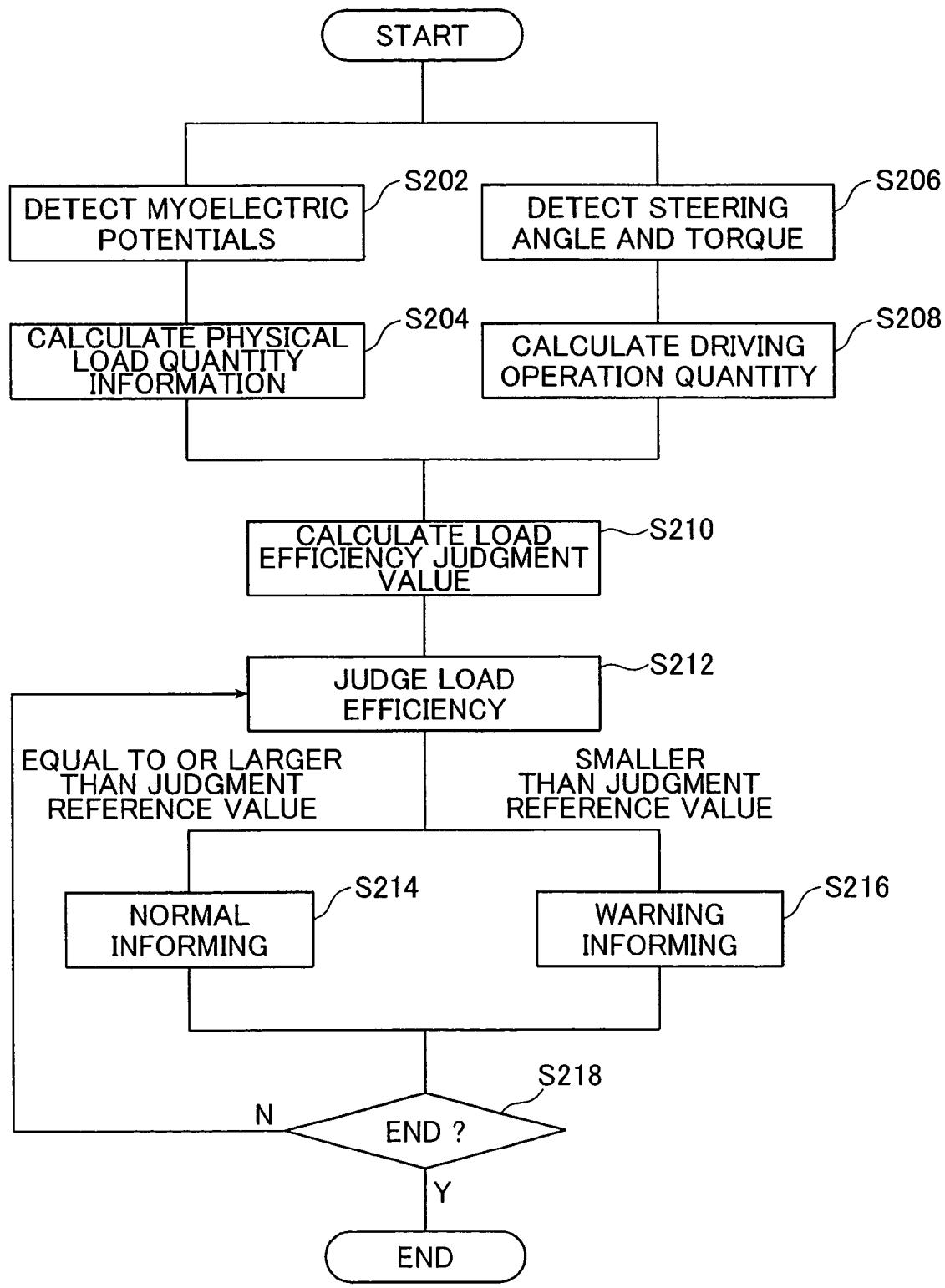
FIG. 12 is a flowchart of an example of the method for informing the efficiency of the physical load of the driver to the driving operation according to the present invention.

A method of informing the driving load efficiency on the driver 12 who is driving the vehicle 11, which is carried out by using the load efficiency informing apparatus 80 as described above, will be described. FIG. 12 is a flowchart of an example of the driving load efficiency informing method according to the present invention, which is carried out by using the load efficiency informing apparatus 80. In the memory 76 of the data processing means 70 according to the present invention, the judgment reference value is stored and set in advance. The judgment reference value is the load efficiency judgment value of a predetermined driver having standard driving skill when the driver drives the vehicle 11 to run on a specific road in the state where the vehicle 11 nearly drives out of the given road, as described above. On the surfaces of the shoulders in which the deltoid muscles of the driver 12 are located, the detection sensors 32 and 34 and the electrode 36 are attached in advance.

Upon a start of informing the driving load efficiency of the driver 12, the physical load measurement means 30 starts detecting the myoelectric potentials of the left and right deltoid muscles of the driver 12 in time series as described above (Step S202). The time-series data of the myoelectric potential at each of the left and right deltoid muscles is sampled by the physical load information calculating section 39 to generate a myoelectric potential waveform. The physical load information calculating section 39 uses the generated myoelectric potential waveform to calculate the physical load information for each predetermined period of time (Step S204). Moreover, upon the start of informing the driving load efficiency of the driver 12, simultaneously with the start of the detection of the myoelectric potentials at the deltoid muscles, the operation quantity measurement means 20 detects the steering angles in time series and the torques in time series as described above (Step S206). The time-series steering angle data and the time-series torque data are sampled by the physical load quantity calculating section 39 to generate the steering angle waveform and the torque waveform. Then, the physical load quantity calculating section 39 uses the steering angle waveform and the torque waveform to calculate the operation quantity information for each predetermined period of time described above (Step S208).

Each time the physical load quantity information and the operation quantity information for each predetermined period of time are calculated, the physical load efficiency judgment value is sequentially calculated for each predetermined period in the load efficiency calculating section 72 (Step S210). Then, the load efficiency level judging section 74 sequentially compares the load efficiency judgment value and the preset judgment reference value. The load efficiency level judging section 74 judges whether or not the load efficiency judgment value of the driver 12 who drives the vehicle 11 is lower than the criterion of judgment, as described above (Step S212). The load efficiency level judging section 74 controls the operation of the informing means 50 to inform the driver 12 of the result of judgment in the informing mode in accordance with the result of judgment. For example, when the physical load efficiency judgment value is equal to or larger than the judgment reference value, the physical load judgment value is displayed on the monitor 52 in a normal mode (Step S214). When the physical load efficiency judgment value is smaller than the judgment reference value, the physical load judgment value is displayed on the monitor 52 in the warning mode and a warning sound is emitted from the speaker 54 (Step S216). The judgment of the load efficiency (Step S212) and the informing (Step S214 or Step S216) are sequentially performed each time the physical load efficiency judgment value for each predetermined period of time is calculated until the end of the driving operation of the vehicle 11 by the driver 12. When the driving operation of the vehicle 11 by the driver 12 ends (i.e., when the result of judgment in Step S218 is YES), the informing of the driving load efficiency is terminated.

Figure 13A:
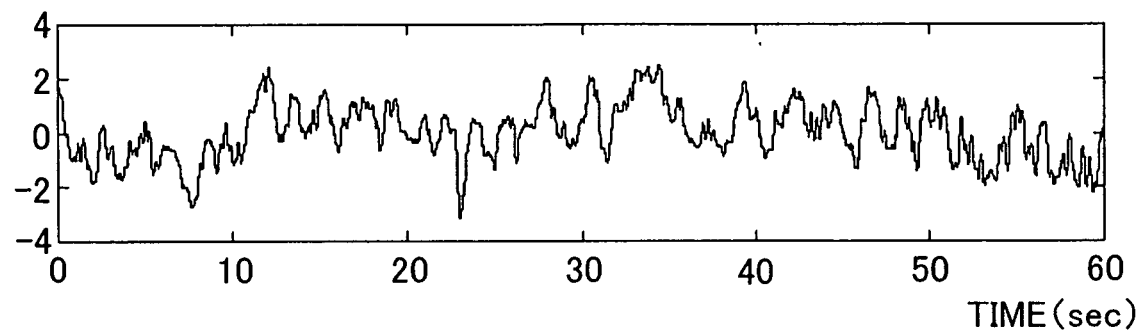
FIG. 13A is a graph showing an example of a steering angle in time series, generated by an operation quantity information calculating section of the apparatus shown in FIG. 11, and FIGS. 11B and 11C are graphs showing time-series myoelectric potential waveforms of the right and left deltoid muscles, which correspond to the steering angle waveform shown in FIG. 11A.
Figure 13B:
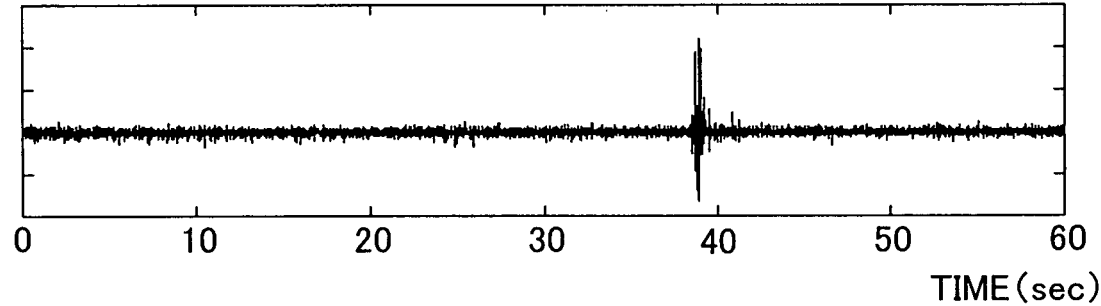
Figure 13C:
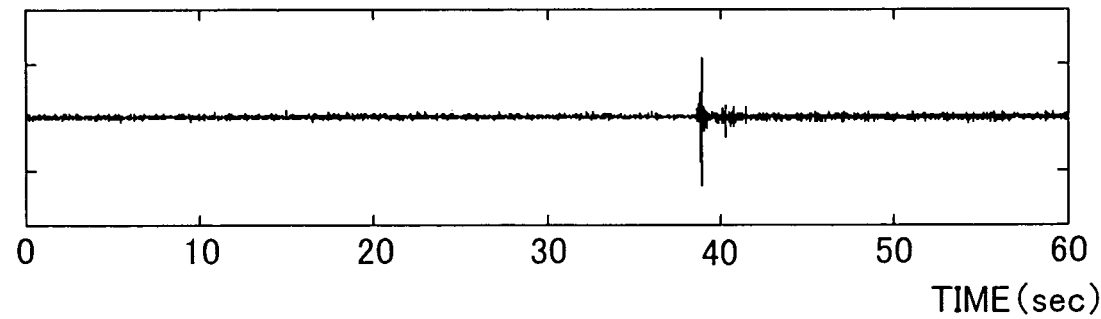

FIG. 13A shows an example of the time-series steering angle data of the vehicle 11, obtained by the operation quantity measurement means 20 in Step S206. FIGS. 13B and 13C show an example of the time-series myoelectric potential data respectively of the left and right deltoid muscles, obtained in Step S202 by the physical load measurement means 30 when the time-series steering angle data shown in FIG. 13A is obtained. In the example shown in FIGS. 13B and 13C, the physical load on the driver 12 temporarily increases (i.e., the deltoid muscles activate) about 39 seconds after the start of running. On the other hand, in the time-series steering angle data shown in FIG. 13A, the steering angle is not particularly varied even at the point of about 39 seconds after the start of running. It is apparent that, at the point of about 39 seconds after the start of running, for example, some event that temporarily increases the physical load on the diver 12 as in the case where a wheel of the vehicle gets stuck in a rut on the road surface and therefore the driver is required to keep the steering wheel against the disturbance (i.e., keep the wheel to prevent the rotation) or the like. In the driver load informing apparatus 80, the time-series myoelectric potential data and the time-series steering angle data, and the time-series torque data are continuously obtained to sequentially calculate the physical load information and the driving operation quantity information for each predetermined period of time.

Figure 14:
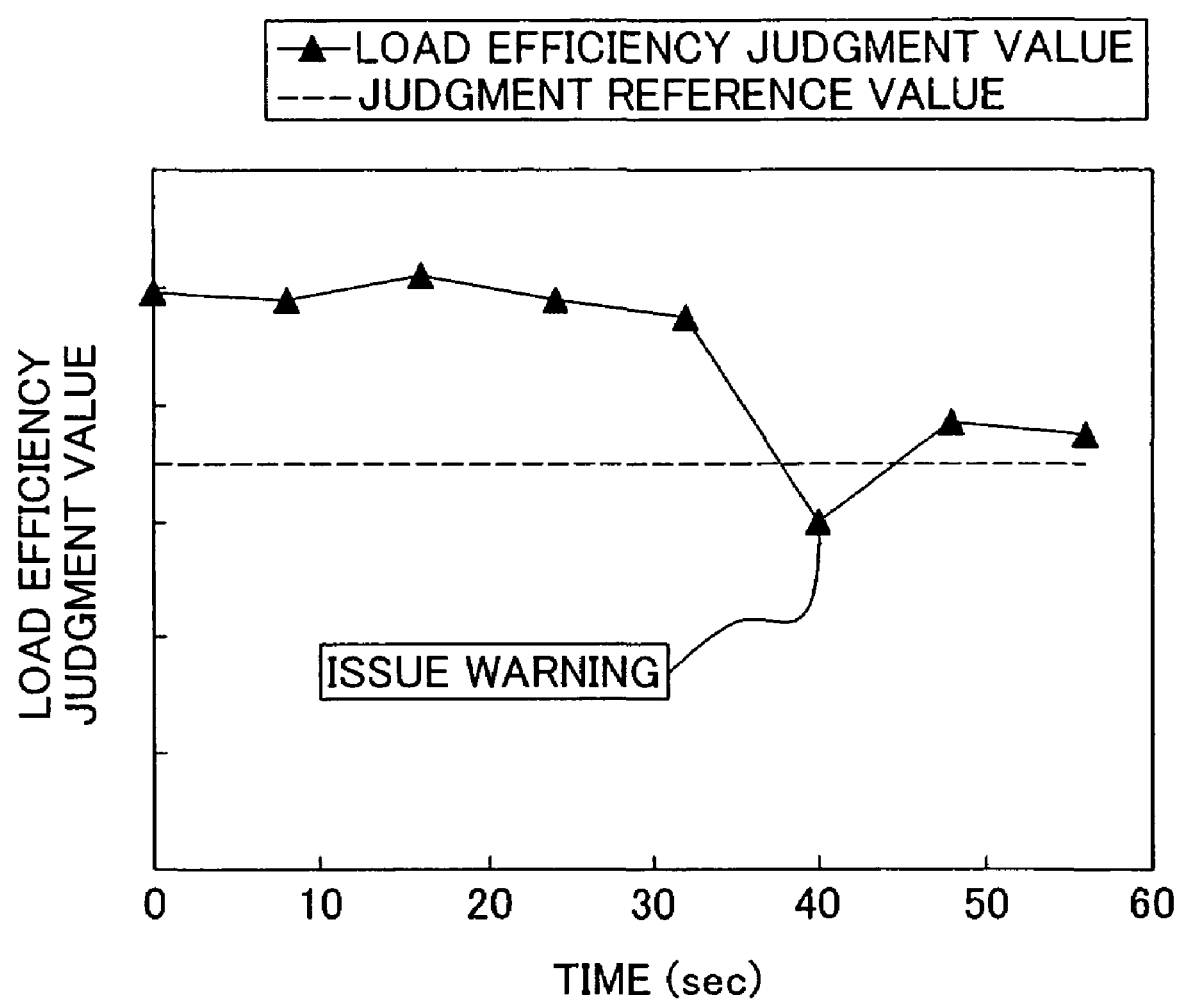
FIG. 14 shows a driving load efficiency judgment value for each predetermined period of time, which is calculated by using the time-series myoelectric potential data of the right and left muscles of the driver shown in FIGS. 13B and 13C and the time-series steering angle data shown in FIG. 13A.

FIG. 14 shows the physical load efficiency judgment value calculated by using the time-series myoelectric potential data of the left and right deltoid muscles of the driver respectively shown in FIGS. 13B and 13C and the time-series steering angle data of the vehicle 11 shown in FIG. 13A. As described above, about 39 seconds after the start of running, the physical load on the driver 12 temporarily increases. On the other hand, even at the point of about 39 seconds after the start of running, the steering angle is not particularly varied. Therefore, at the period of time corresponding to about 39 seconds after the start of running, the physical load efficiency judgment value greatly drops to be below the judgment reference value. The load efficiency informing apparatus 80 issues a warning by the informing means 50 at the time when the result of judgment is obtained, thereby informing the driver 12 that the driving load efficiency is lowered.

By using the load efficiency informing apparatus 80 as described above, the driver 12 can recognize in real time whether or not the efficiency of the physical load on the driver 12 drops to allow the driver 12 to exhibit only low skill during the driving operation of the vehicle. As a result, when the efficiency of the physical load on the driver 12 himself/herself drops, the driver 12 can take measures to enhance driving safety in real time, for example, by more careful and cautious driving. Moreover, the driver 12 can precisely recognize a situation under which his/her own driving skill should be improved to improve the overall driving skill. By driving training based on the information described above, the driving skill can be efficiently improved.

According to the informing apparatus according to the present invention, as in the case of the evaluating apparatus described above, for example, the driver can recognize his/her own driving skill under each of various driving conditions. For example, the driver 12 can recognize the type of road (e.g., the urban area or the mountain road) at which the driver has less skill, the type of vehicle (e.g., a compact vehicle such as a light vehicle or a large-size vehicle such as an RV vehicle) at which the driver has less skill, or the like. Moreover, the efficiency of the physical load under each driving condition can be qualitatively and quantitatively evaluated. By using the informing apparatus for training the driving of the driver, the result and the achievement of the training can be precisely judged. For example, the informing apparatus according to the present invention can be suitably used for driving training of a driver in name only driver or the like who feels uncomfortable in driving, for driving training of those who wish to obtain a commercial driver's license for a bus, taxi, and the like, for driving training under a bad condition such as on a snowy road or an icy road, for driving training of a beginner or the like who is unused to driving, for practice of motor sports or the like, for training a test driver, and the like.

The apparatus and the method for evaluating the driving skill of the driver and the apparatus and the method for informing the efficiency of the physical load of the driver to the driving operation according to the present invention have been described above in detail. However, the present invention is not limited to the above-described embodiment. It is apparent that various modifications and changes are possible without departing from the scope of the present invention.

The invention claimed is:
1. An evaluating apparatus for evaluating driving skill of a driver who drives a vehicle, the evaluating apparatus including:
   driver load measurement means for measuring the degree of physical load on the driver in a driving operation activity of the vehicle;
   driving operation quantity measurement means for measuring a quantity of driving operation performed by the driver for the vehicle in the driving operation activity; and
   evaluation means for evaluating the driving skill of the driver by using the degree of the physical load on the driver and the quantity of driving operation,
   wherein the driver load measurement means includes:
   a myoelectric potential detecting section for detecting myoelectric potentials of a pair of right and left muscles of the driver, the pair of the muscles being involved in the driving operation activity; and
   a load calculating section for calculating first data indicative of the physical load from the detected myoelectric potentials,
   wherein the driving operation quantity measurement means includes:
   a steering angle detecting section for detecting a steering angle of the vehicle, the steering angle being generated with the driving operating activity of the driver;
   a steering torque detecting section for detecting a steering torque about a steering shaft of the vehicle, the steering torque being generated with the driving operation activity; and an operation calculating section for calculating second data indicative of the driving operation from the detected steering angle and the detected steering torque, and wherein the evaluation means calculates, as an evaluation value, a ratio of an integrated operation quantity value to an integrated load quantity value or a difference between the integrated operation quantity value and the integrated load quantity value, in which the integrated load quantity value is obtained by integrating the calculated first data over a predetermined time and the integrated operation quantity value is obtained by integrating the calculated second data over the predetermined time.

2. The evaluating apparatus according to claim 1, wherein the evaluation means calculates an evaluation value indicating efficiency of the physical load on the driver in the driving operation activity of the vehicle to a workload performed by the driver for the vehicle in the driving operation activity of the vehicle from the degree of physical load on the driver and the quantity of driving operation to judge a level of the driving skill of the driver by using the evaluation value.

3. The evaluating apparatus according to claim 2, wherein the evaluation means compares the evaluation values and a predetermined reference value with each other to judge a level of the driving skill of the driver based on a result of the comparison.

4. The evaluating apparatus according to claim 3, wherein the predetermined reference value is set in accordance with at least one of the vehicle driven by the driver and a road on which the vehicle runs by the driving of the driver.

5. The evaluating apparatus according to claim 1, wherein the evaluating apparatus further includes mental load quantity measurement means for measuring a mental load quantity generated with the driving operation activity of the driver who drives the vehicle, and the evaluation means uses the mental load quantity in addition to the degree of physical load on the driver and the quantity of driving operation to evaluate the driving skill of the driver.

6. The evaluating apparatus according to claim 5, wherein the mental load quantity measurement means detects an activity of a muscle which is independent of the driving operation of the driver and measures the mental load quantity based on the activity of the muscle.

7. The evaluating apparatus according to claim 1, further including trajectory deviation measurement means for detecting the amount of deviation of a trajectory of the vehicle by the driving operation activity of the driver from a lane along which the vehicle is targeted to run, and the evaluation means evaluates the driving skill of the driver by using the amount of deviation of the trajectory of the vehicle in addition to the degree of physical load on the driver and the quantity of driving operation.

8. The evaluating apparatus according to claim 1, wherein the evaluation means corrects the result of evaluation based on at least one piece of information indicating a state of the vehicle, information indicating a condition of the road, and information indicating a state of an ambient environment of the vehicle.

9. The evaluating apparatus according to claim 1, wherein the evaluation means outputs the result of evaluation of the driving skill of the driver in association with a road surface condition of the road.

10. The evaluating apparatus according to claim 1, wherein the load calculating section calculates root means squares of the respective myoelectric potentials of the muscles and further calculates an average of the calculated root means squares as the first data, and wherein the operation calculating section calculates a work rate by multiplying the detected steering torque and a steering velocity which is obtained by time-differentiating the detected steering angle, to obtain root means square of the work rate or an integral value of the work rate as the second data.

11. An apparatus for informing a driver who drives a vehicle of efficiency of a physical load of the driver to a driving operation activity of the vehicle, the apparatus including:

driver load measurement means for measuring the degree of physical load on the driver in the driving operation activity of the vehicle;

driving operation quantity measurement means for measuring the quantity of driving operation performed by the driver for the vehicle in the driving operation activity;

load efficiency judgment value calculating means for calculating a load efficiency judgment value indicating a efficiency of the physical load on the driver in the driving operation activity of the vehicle to the quantity of driving operation performed by the driver for the vehicle in the driving operation activity of the vehicle, by using the degree of the physical load on the driver and the quantity of driving operation; and informing means for informing the driver of the efficiency of the physical load on the driver to the driving operation activity of the vehicle in accordance with the load efficiency judgment value, wherein the driver load measurement means includes:

a myoelectric potential detecting section for detecting myoelectric potentials of a pair of right and left muscles of the driver, the pair of the muscles being involved in the driving operation activity;

a load calculating section for calculating first data indicative of the physical load from the detected myoelectric potentials, wherein the driving operation quantity measurement means includes:

a steering angle detecting section for detecting a steering angle of the vehicle, the steering angle being generated with the driving operating activity of the driver;

a steering torque detecting section for detecting a steering torque about a steering shaft of the vehicle, the steering torque being generated with the driving operation activity; and an operation calculating section for calculating second data indicative of the driving operation from the detected steering angle and the detected steering torque, and wherein the load efficiency judgment value calculating means calculates, as a load efficiency judgment value, a ratio of an integrated operation quantity value to an integrated load quantity value or a difference between the integrated operation quantity value and the integrated load quantity value, in which the integrated load quantity value is obtained by integrating the calculated first data over a predetermined time and the integrated operation quantity value is obtained by integrating the calculated second data over the predetermined time.

12. The apparatus according to claim 11, further including judgment means for comparing the load efficiency judgment value calculated by the load efficiency judgment value calculating means and a predetermined judgment reference value to judge a level of the efficiency of the physical load on the driver to the driving operation activity of the vehicle based on a result of comparison, in which the informing means informs the driver of the efficiency of the physical load on the driver in an informing mode in accordance with the result of judgment.

13. The apparatus according to claim 12, wherein the informing means issues a warning to the driver when the load efficiency judgment value is smaller than a predetermined warning reference value in the judgment means.

14. The apparatus according to claim 11, wherein the load calculating section calculates root means squares of the respective myoelectric potentials of the muscles and further calculates an average of the calculated root means squares as the first data, and
wherein the operation calculating section calculates a work rate by multiplying the detected steering torque and a steering velocity which is obtained by time-differentiating the detected steering angle, to obtain root means square of the work rate or an integral value of the work rate as the second data.

15. A method of evaluating driving skill of a driver who drives a vehicle, including:
a driver load measuring step of measuring the degree of physical load on the driver in a driving operation activity of the vehicle;
a driving operation quantity measuring step of measuring the quantity of driving operation performed by the driver for the vehicle in the driving operation activity of the vehicle; and
an evaluating step of evaluating the driving skill of the driver by using the degree of physical load on the driver and the quantity of driving operation,
wherein in the driver load measuring step, myoelectric potentials of a pair of right and left muscles of the driver are detected, the pair of the muscles being involved in the driving operation activity; and first data indicative of the physical load are calculated from the detected myoelectric potentials,
wherein in the driving operation quantity measuring step, a steering angle of the vehicle is detected, the steering angle being generated with the driving operating activity of the driver; a steering torque about a steering shaft of the vehicle is detected, the steering torque being generated with the driving operation activity; and second data indicative of the driving operation are calculated from the detected steering torque and the detected steering angle, and
wherein in the evaluating step, a ratio of an integrated operation quantity value to an integrated load quantity value or a difference between the integrated operation quantity value and the integrated load quantity value is calculated as an evaluation value in which the integrated load quantity value is obtained by integrating the calculated first data over a predetermined time and the integrated operation quantity value is obtained by integrating the obtained second data over the predetermined time.

16. The method according to claim 15, wherein the evaluating step calculates an evaluation value indicating efficiency of the degree of physical load on the driver in the driving operation activity of the vehicle to the quantity of driving operation performed by the driver for the vehicle in the driving operation activity of the vehicle from the degree of physical load on the driver and the quantity of driving operation to judge a level of the driving skill of the driver by using the evaluation value.

17. The method according to claim 15, wherein in the driver load measuring step, root means squares of the respective myoelectric potentials of the muscles are calculated and further an average of the calculated root means squares is calculated as the first data, and
wherein in the driving operation quantity measuring step, a work rate is calculated by multiplying the detected steering torque and a steering velocity which is obtained by time-differentiating the detected steering angle, to obtain root means square of the work rate or an integral value of the work rate as the second data.

18. A method of informing a driver who drives a vehicle of efficiency of a physical load of the driver to a driving operation activity of the vehicle, the method including:
a driver load measuring step of measuring the degree of physical load on the driver in the driving operation activity of the vehicle;
a driving operation quantity measuring step of measuring the quantity of driving operation performed by the driver for the vehicle in the driving operation activity;
a load efficiency judgment value calculating step of calculating a load efficiency judgment value indicating efficiency of the degree of physical load on the driver in the driving operation activity of the vehicle to the quantity of driving operation performed by the driver for the vehicle in the driving operation activity of the vehicle by using the degree of physical load on the driver and the quantity of driving operation; and
an informing step of informing the driver of the efficiency of the physical load on the driver to the driving operation activity of the vehicle in accordance with the load efficiency judgment value,
wherein in the driver load measuring step, myoelectric potentials of a pair of right and left muscles of the driver are detected, the pair of the muscles being involved in the driving operation activity; and first data indicative of the physical load are calculated from the detected myoelectric potentials,
wherein in the driving operation quantity measuring step, a steering angle of the vehicle is detected, the steering angle being generated with the driving operating activity of the driver; a steering torque about a steering shaft of the vehicle is detected, the steering torque being generated with the driving operation activity; and second data indicative of the driving operation is calculated from the detected steering torque and the detected steering angle, and
wherein in the load efficiency judgment value calculating step, a ratio of an integrated operation quantity value to an integrated load quantity value or a difference between the integrated operation quantity value and the integrated load quantity value is calculated as a load efficiency judgment value in which the integrated load quantity value is obtained by integrating the calculated first data over a predetermined time and the integrated operation quantity value is obtained by integrating the calculated second data over the predetermined time.

19. The method according to claim 18, wherein in the driver load measuring step, root means squares of the respective myoelectric potentials of the muscles are calculated and further an average of the calculated root means squares is calculated as the first data, and
wherein in the driving operation quantity measuring step, a work rate is calculated by multiplying the detected steering torque and a steering velocity which is obtained by time-differentiating the detected steering angle, to obtain root means square of the work rate or an integral value of the work rate as the second data.

* * * * *

UNITED STATES PATENT AND TRADEMARK OFFICE
CERTIFICATE OF CORRECTION

PATENT NO. : 7,649,445 B2  Page 1 of 1
APPLICATION NO. : 11/454189
DATED : January 19, 2010
INVENTOR(S) : Kuramori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this

Twenty-eighth Day of December, 2010

David J. Kappos
*Director of the United States Patent and Trademark Office*